US007007049B2

(12) United States Patent
Peng

(10) Patent No.: US 7,007,049 B2
(45) Date of Patent: Feb. 28, 2006

(54) DEVICE MEMORY MANAGEMENT DURING ELECTRONIC FILE UPDATING

(75) Inventor: Luosheng Peng, Alviso, CA (US)

(73) Assignee: InnoPath Software, Inc., Sunnyvale, CA (US)

( * ) Notice: Subject to any disclaimer, the term of this patent is extended or adjusted under 35 U.S.C. 154(b) by 405 days.

(21) Appl. No.: 10/298,458

(22) Filed: Nov. 18, 2002

(65) Prior Publication Data

US 2004/0098427 A1    May 20, 2004

(51) Int. Cl.
*G06F 17/30* (2006.01)
(52) U.S. Cl. .......................... 707/205; 707/4; 707/203; 711/111
(58) Field of Classification Search .............. 707/1–10, 707/100–104.1, 200–206; 365/230.03, 230.04, 365/230.05, 230.06, 230.07, 230.08, 230.09, 365/231; 711/111, 170, 209
See application file for complete search history.

(56) References Cited

U.S. PATENT DOCUMENTS

| | | | |
|---|---|---|---|
| 5,479,654 A | 12/1995 | Squibb | |
| 5,574,906 A | 11/1996 | Morris | |
| 5,742,905 A | 4/1998 | Pepe | |
| 5,806,078 A | 9/1998 | Hug | |
| 5,813,017 A | 9/1998 | Morris | |
| 5,832,520 A | 11/1998 | Miller | 707/203 |
| 6,018,747 A | 1/2000 | Burns | |
| 6,041,333 A * | 3/2000 | Bretschneider et al. | 707/203 |
| 6,052,531 A | 4/2000 | Waldin | |
| 6,088,694 A | 7/2000 | Burns | |
| 6,128,629 A * | 10/2000 | Bretschneider et al. | 707/203 |
| 6,167,258 A | 12/2000 | Schmidt | |
| 6,233,589 B1 | 5/2001 | Balcha | |
| 6,269,456 B1 | 7/2001 | Hodges | |
| 6,327,671 B1 | 12/2001 | Menon | |
| 6,349,311 B1 | 2/2002 | Sobel | |
| 6,374,250 B1 | 4/2002 | Ajtai | |
| 6,401,239 B1 | 6/2002 | Miron | |
| 6,442,660 B1 | 8/2002 | Henerlau | |
| 6,470,329 B1 | 10/2002 | Livschitz | |
| 6,526,574 B1 | 2/2003 | Jones | |
| 6,535,894 B1 | 3/2003 | Schmidt | |
| 6,542,906 B1 | 4/2003 | Korn | |

(Continued)

OTHER PUBLICATIONS

Tichy, Walter F., "The string-to-string correction problem with block moves", ACM Transaction on Computer Systems, vol. 2, No. 4, Nov. 1984, pp. 309-321.

(Continued)

*Primary Examiner*—Shahid Alam
*Assistant Examiner*—Jean Bolte Fleurantin
(74) *Attorney, Agent, or Firm*—Courtney Staniford & Gregory LLP

(57) ABSTRACT

In performing memory management, an upgrade client of a host device identifies and reserves memory blocks large enough to accommodate new software components by performing sequential searches of first and second memory areas. The new software components are updated versions of components of original software files. When the new component size exceeds that of available blocks of the first and second memory areas, the upgrade client rewrites the first memory area to eliminate unused memory blocks, reapportions the first and second memory areas, writes the new component to the second memory area, and updates a vector table. To access host device software components, the upgrade client receives a function call from the main program of the host device including identification information of corresponding software files, reads a start address of the corresponding software files from the vector table, and generates a call for the corresponding software files.

2 Claims, 20 Drawing Sheets

U.S. PATENT DOCUMENTS

| | | |
|---|---|---|
| 6,594,822 B1 | 7/2003 | Schweitz |
| 6,615,404 B1 | 9/2003 | Garfunkel |
| 6,651,061 B1 * | 11/2003 | Unchida et al. ............... 707/9 |
| 6,651,190 B1 | 11/2003 | Worley |
| 6,671,703 B1 | 12/2003 | Thompson |
| 6,671,757 B1 | 12/2003 | Multer |
| 6,694,336 B1 | 2/2004 | Multer |
| 6,836,657 B1 | 12/2004 | Ji |
| 2001/0029178 A1 | 10/2001 | Criss |
| 2001/0049263 A1 | 12/2001 | Zhang |
| 2002/0099726 A1 | 7/2002 | Crudele |
| 2002/0129107 A1 | 9/2002 | Loughran |
| 2003/0110253 A1 | 6/2003 | Anuszczyk |
| 2003/0200207 A1 | 10/2003 | Dickinson |
| 2003/0212712 A1 * | 11/2003 | Gu et al. ................... 707/200 |
| 2004/0062130 A1 * | 4/2004 | Chiang ................. 365/230.03 |
| 2004/0092255 A1 | 5/2004 | Ji |
| 2004/0098361 A1 | 5/2004 | Peng |
| 2004/0098413 A1 | 5/2004 | Peng |
| 2004/0098420 A1 | 5/2004 | Peng |
| 2004/0098421 A1 | 5/2004 | Peng |
| 2004/0111427 A1 | 6/2004 | Gu |
| 2004/0220980 A1 | 11/2004 | Forster |

OTHER PUBLICATIONS

Ajtai, Miklos et al., "Compactly encoding unstructured inputs with differential compression", IBM Almaden Research Center, 44 pages.

Burns, Randal C. et al., "In-place reconstruction of delta compressed files", IBM Almaden Research Center, 9 pages.

Burns, Randal et al., "In-place reconstruction of version differences", IBM Almaden Research Center, 25 pages.

Liv, Jacob et al., "A universal algorithm for sequential data compression", IEEE Transactions on Information Theory, vol. IT-23, No. 3, May 1977.

* cited by examiner

DEVICE MEMORY MANAGEMENT DURING ELECTRONIC FILE UPDATING

RELATED APPLICATIONS

This application is related to the application titled BYTE-LEVEL FILE DIFFERENCING AND UPDATING ALGORITHMS, application Ser. No. 10/146,545, filed May 13, 2002, the application titled UPDATING ELECTRONIC FILES USING BYTE-LEVEL FILE DIFFERENCING AND UPDATING ALGORITHMS, application Ser. No. 10/261,153, filed Sep. 30, 2002, the application titled UPGRADING OF ELECTRONIC FILES INCLUDING AUTOMATIC RECOVERY FROM FAILURES AND ERRORS OCCURRING DURING THE UPGRADE, application Ser. No. 10/292,245, now U.S. Pat. No. 6,836,657, filed Nov. 12, 2002, the application titled GENERATING DIFFERENCE FILES USING MODULE INFORMATION OF EMBEDDED SOFTWARE COMPONENTS, application Ser. No. 10/298,393, filed Nov. 18, 2002, the application titled CONTROLLING UPDATES OF ELECTRONIC FILES, application Ser. No. 10/298,863, filed Nov. 18, 2002, the application titled SCHEDULING UPDATES OF ELECTRONIC FILES, application Ser. No. 10/298,862, filed Nov. 18, 2002, and the application titled MANAGING ELECTRONIC FILE UPDATES ON CLIENT DEVICES, application Ser. No. 10/298,896, filed Nov. 18, 2002, all of which are currently pending.

TECHNICAL FIELD

The disclosed embodiments relate to memory management during electronic file updating.

BACKGROUND

Software that runs on a Central Processing Unit (CPU) in order to fulfill certain functionality of the host device often changes over time. The changes may result from the need to correct software bugs, adapt to evolving technologies, or add new features to the host device. In particular, embedded software in mobile wireless devices like cellular telephones often includes more bugs than other portable devices or processing systems and generally requires more frequent updates to add new features to the device.

Software includes one or more files which can be in the form of American Standard Code for Information Interchange (ASCII) plain text files or binary code. Software files can be divided into smaller units that are often referred to as components or modules. In the current art, a UNIX platform or Personal Computer (PC) includes multiple software components, and each of the software components is managed and updated independently through a file system supported by a corresponding Operating System (OS). Information used to update software files or software components hosted on UNIX platforms or PCs can be transferred through the Internet or loaded from a secondary storage medium such as a floppy disk, a compact disk read-only memory (CD-ROM), or a compact flash card.

In contrast, in most mobile wireless devices, a real-time OS (RTOS) is typically used in which all software components are linked as a single large file. Further, no file system support is typically provided in these mobile wireless devices. In addition, the single large file needs to be pre-loaded, or embedded, into the device using a slow communication link like a radio, infrared, or serial link.

Obstacles to the update of large files via slow communication links include the time of delivering the updated file to the device. In cases where a difference file is transferred to the device hosting the files targeted for update/revision, this time includes both the communication time to transfer the difference file and the time used by the receiving device to process the difference file and update/revise the targeted files, referred to herein as the host device processing time. While use of a delta file to transfer updated software file or software component information significantly reduces the communication time, as described in the Related Applications, reduction of the host device processing time is dictated at least in part by the host device architecture.

The host device can be any of a number of processor-based devices, including cellular telephones and other mobile communication devices, personal digital assistants (PDAs), and personal computers. Using cellular telephones as an example, the typical cellular telephone architecture includes flash read-only memory (ROM), referred to herein as flash ROM or flash memory, and an RTOS. Both the flash memory and the RTOS potentially introduce obstacles to the goal of reducing the host device processing time.

The problem that arises with respect to the flash memory in reducing the host device processing time involves the manner with which writes are performed to flash memory. Flash memory is allocated in units which are often referred to as blocks, sectors, or segments, each of which includes numerous bytes. A write (or rewrite) to the typical flash memory requires erasing and writing (or rewriting) an entire unit, meaning that single bits or bytes can not be written (or rewritten). Therefore the update or revision of a byte stored in flash memory requires erasing and rewriting the entire unit in which the byte is stored. Thus, the time required to update or revise files stored in flash memory is typically greater than that required to update or revise files stored in other types of storage or memory in which single bytes can be written (or rewritten).

The problem that arises with respect to the RTOS in reducing the host device processing time involves the manner in which host device software programs are organized and managed. The RTOS of typical cellular telephones does not support file management and dynamic address resolution for function calls at runtime. Therefore, all embedded software components or programs of the cellular telephone are linked into a single, large host program, and a function within the host program is called from any part of the host program directly through a precompiled start address of the function. Thus, in contrast to a typical computer OS in which file management and dynamic address resolution for function calls are supported, the typical cellular telephone RTOS does not have the capability to manage multiple software components as separate files and support the function calls from one of the software components to another via runtime calling address resolution. Consequently, the host program of a system including an RTOS manages a single, large program and uses static addressing to directly access functions of the program.

This typical device architecture can lead to a problem when updating and revising software components because when the revision or update results in changes in host program size there is a resultant change in the start addresses of the software components that follow the updated/revised software component in the host program. This change in the start address of a software component results in a need to update the corresponding calling addresses in the host program and the instruction/data addresses within the software component. This can be expensive in terms of processing time. Thus, host device processing time associated with embedded software updates/revisions is due in large part to the inefficient rewriting of data to flash memory and the fact that a small change to embedded software at the source code level can result in a large change to the embedded software at the binary code level.

Figure 1:
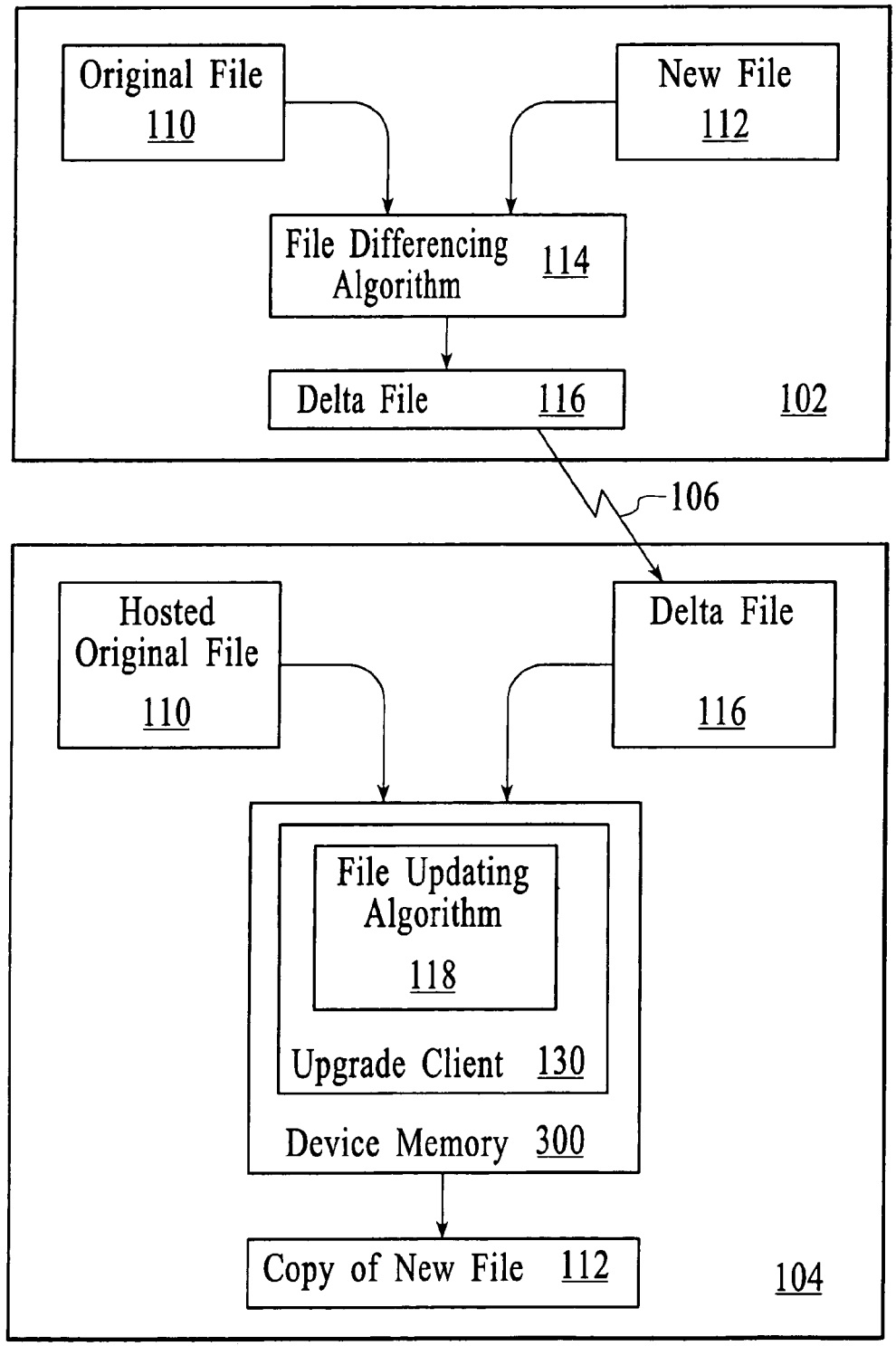
FIG. 1 is a block diagram of a system for updating electronic files using a byte-level file differencing and updating (FDU) algorithm, under an embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 130 is first introduced and discussed with respect to FIG. 1).

Unless described otherwise below, the construction and operation of the various blocks and structures shown in the Figures are of conventional design. As a result, such blocks need not be described in further detail herein, because they will be understood by those skilled in the relevant art. Such further detail is omitted for brevity and so as not to obscure the detailed description of the invention. Any modifications necessary to the Figures can be readily made by one skilled in the relevant art based on the detailed description provided herein.

DETAILED DESCRIPTION

A memory management system and method are described in detail herein. In performing memory management, an upgrade client of a host device identifies and reserves memory blocks large enough to accommodate new software components by performing sequential searches of first and second memory areas. The new software components are updated or upgraded versions of components of original software files. When the new component size is equal to or smaller than the size of a corresponding component of the original electronic file, the update client allocates an original memory block of a first memory area into which to write the received component. The original memory block includes the corresponding component of the original electronic file.

When the new component size exceeds the size of the corresponding component of the original electronic file, the upgrade client searches unused portions of the first memory area for a memory block large enough to store the received component. The upgrade client reserves a memory block of the appropriate size if one is located in the first memory area, otherwise the upgrade client searches the second memory area. The upgrade client reserves a memory block of the appropriate size if one is located in the second memory area.

When, however, the new component size exceeds that of available blocks of the first and second memory areas, the upgrade client rewrites the first memory area to eliminate unused memory blocks. Following rewriting of the first memory area, the upgrade client reapportions the first and second memory areas by sequentially rewriting software components of the second memory area to the unused portion of the first memory area where component size and available blocks of the first memory area permit. Subsequently, the upgrade client re-designates the remaining unused portion of the first memory area as part of the second memory area. Following the reapportionment, the upgrade client writes the new component to the second memory area and updates a vector table.

With regard to accessing host device software components, the upgrade client receives a function call from the main program of the host device, where the function call includes identification information of corresponding software files. The upgrade client uses the identification information to access the vector table and read a start address of the corresponding software files from the vector table. Using the start address from the vector table along with the identification information, the upgrade client generates a call to the corresponding software files.

FIG. 1 is a block diagram of a system for updating electronic files using a byte-level file differencing and updating (FDU) algorithm, herein referred to as the FDU algorithm, under an embodiment. The FDU algorithm includes a differencing component and an updating component. The differencing component, referred to herein as the file differencing algorithm and described in detail in the Related Applications, generates a difference file in a first computer system from an original version and a new version of an electronic file. The updating component, referred to herein as the file updating algorithm and described in detail in the Related Applications, generates a copy of the new file on a second computer system using the difference file and the hosted copy of the original file. In the following description, numerous specific details are introduced to provide a thorough understanding of, and enabling description for, embodiments of the invention. One skilled in the relevant art, however, will recognize that the invention can be practiced without one or more of the specific details, or with other components, systems, etc. In other instances, well-known structures or operations are not shown, or are not described in detail, to avoid obscuring aspects of the invention.

With reference to FIG. 1, a first computer system 102 and a second computer system 104 communicate via a communication path 106. These computer systems 102 and 104 include any collection of computing devices operating together, as is known in the art. The computer systems 102 and 104 also include components within a larger computer system. The communication path 106 includes any medium by which files are communicated or transferred between the computer systems 102 and 104. Therefore, this path 106 includes wireless connections, wired connections, and hybrid wireless/wired connections. The communication path 106 also includes couplings or connections to networks including local area networks (LANs), metropolitan area networks (MANs), wide area networks (WANs), proprietary networks, interoffice or backend networks, and the Internet. Furthermore, the communication path 106 includes removable fixed mediums like floppy disks, hard disk drives, and CD-ROM disks, as well as flash RAM, Universal Serial Bus (USB) connections, RS-232 connections, telephone lines, buses, and electronic mail messages.

The first communication system 102 receives an original, or old, version 110 and a new version 112 of an electronic file. The new file 112 is generally an updated or revised version of the original file 110, but is not so limited. The electronic files 110 and 112 include software files including dynamic link library files, shared object files, embedded software components (EBSCs), firmware files, executable files, data files including hex data files, system configuration files, and files including personal use data, but are not so limited. Since any type of file can be regarded as a byte stream, hereafter a file can be described as a byte stream.

The file differencing algorithm 114 receives the new file 112, compares it to the original file 110, and calculates the byte-level differences between the compared files, as described below. The file differencing algorithm 114 may also pre-process the original 110 and the new 112 files to reduce the sizes of the files prior to the calculation of the file differences. The file differencing algorithm 114 generates a difference file 116, referred to herein as a delta file, during the comparison.

Contents of the delta file 116 provide an efficient representation of the byte-level differences between the new and the original files. The delta file 116 includes meta-data along with actual data of replacement and/or insertion operations that represent the differences between the new or current version of the associated file and previous versions of the file, as described below. The file differencing algorithm 114 provides any differences between the original 110 and the new 112 files in the delta file 116 using a minimum number of bytes and a pre-defined format or protocol, thereby providing a delta file optimized in space.

The delta file 116 is transferred or transmitted to another computer system 104 via the communication path 106. Prior to transfer, the delta file 116 may be compressed using compression techniques known in the art, but is not so limited. The file updating algorithm 118 hosted on the receiving computer system 104 uses the delta file 116 along with the hosted original file 110 to generate or create a copy of the new file 112. This copy of the new file 112 is then used to update the original file 110 hosted on the client device 104 that is targeted for revision or updating. Upon completion of this update process, the original file 110 now stored on the second computer system 104 is identical to the new file received in the first computer system.

The differences between an original file and a new file are typically smaller than the new file, leading to significant storage and transmission savings if the differences are transmitted and stored instead of the entire new byte stream. This is particularly important for mobile electronic devices hosting programs that are updated via connections that typically can be slow and expensive, for example wireless or cellular connections.

Figure 2:
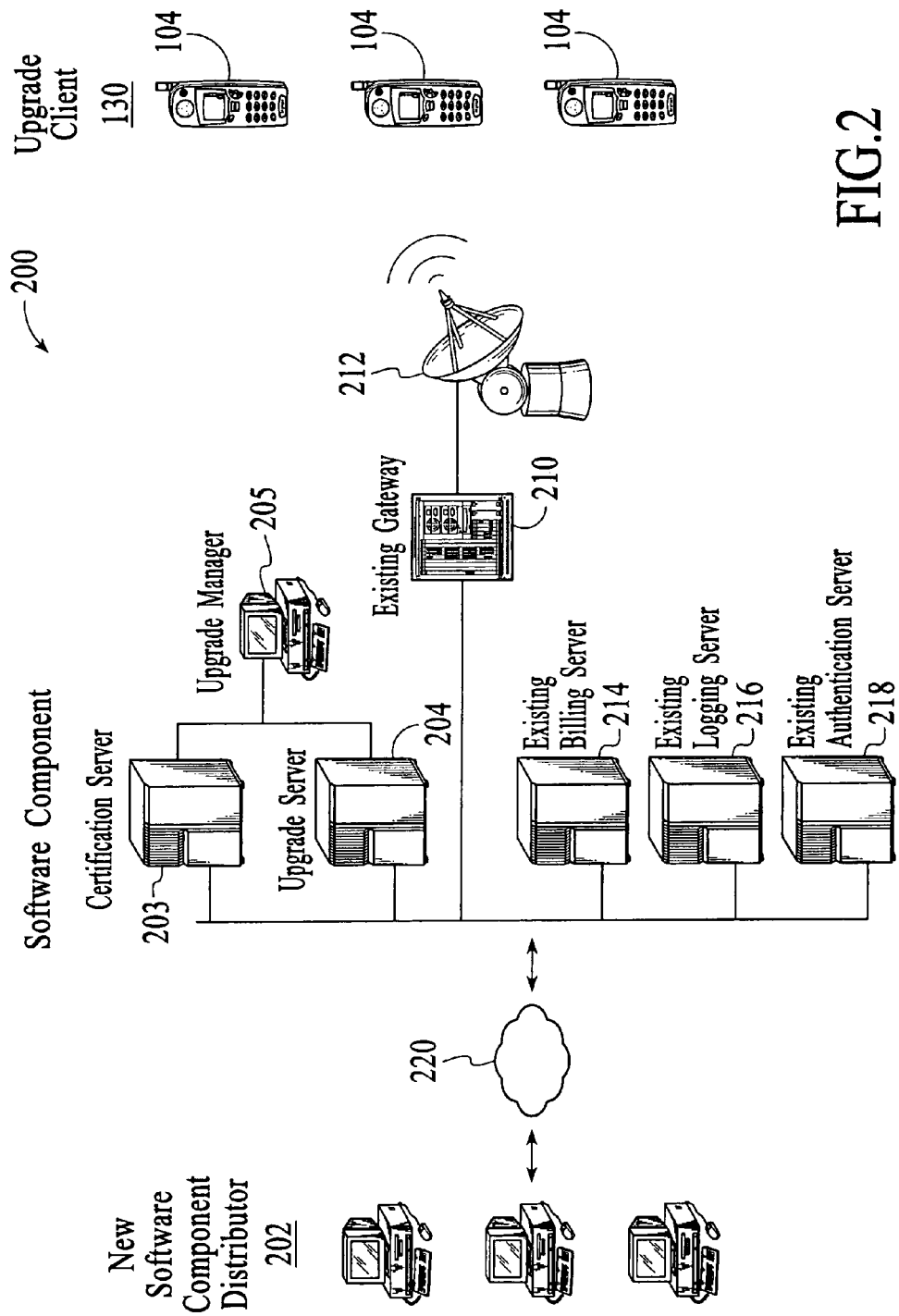
FIG. 2 is a block diagram of a software upgrade system, under an embodiment.

FIG. 2 is a block diagram of a software upgrade system 200, referred to herein as the upgrade system, of an embodiment. The upgrade system 200 uses the delta file and file updating algorithm of an embodiment in supporting software maintenance and application management for client devices including mobile electronic devices, mobile communication devices, cellular telephones, personal digital assistants, computers, and other processor-based devices. This support is provided for all device software ranging from firmware to embedded applications by enabling carriers and device manufacturers to efficiently distribute electronic file content and applications via a wireless infrastructure.

The upgrade system 200 prevents device recalls by supporting the provision of new and revised software files to mobile client devices via various mechanisms of the service provider's wireless infrastructure. These systems function by receiving new and revised software from a software distributor and generating a delta file from the new software using the file differencing algorithm. The delta file is transferred to the client device via the infrastructure of a service provider. The upgrade client, including the file updating algorithm, of the receiving or client device uses the delta file to update the targeted software hosted on the client device.

The upgrade system 200 enables different life cycles between device software and hardware. This upgrade system, therefore, supports up-to-date device functionality in view of the fact that critical software components such as Java™ Connected Limited Device Configuration (CLDC) libraries, Moving Pictures Experts Group-1 (MPEG-1) Layer III (MP3) drivers, communication software, and browser applications evolve faster than the host device hardware and are consequently updated with greater frequency than mobile device manufacturers deliver a new generation of devices. The upgrade system 200 is described in further detail below.

With reference to FIG. 2, the upgrade system 200 maintains embedded software components on client devices 104 via a wireless connection with the device 212, thereby enabling wireless carriers to continuously provide the latest data services to all users. The upgrade system 200 includes, but is not limited to, a new software component distributor or software component distributor 202, service provider upgrade components 203–205, and an upgrade client 130 hosted on the client device 104. The service provider upgrade components include an upgrade server 204 coupled among a software component certification server 203 and an upgrade manager 205.

The software component distributor 202 of an embodiment provides a web-based user interface by which software providers package and release new embedded device software components such as an improved MP3 driver, an upgraded Java™ 2 Platform, Micro Edition (J2ME™) Mobile Information Device Profile (MIDP) library, or a feature-added address book application. Functions of the software component distributor 202 include registering device information and submitting device information to the software component certification server. Also, the software component distributor 202 receives new and original EBSCs and calculates byte-level file differences therefrom using the file differencing algorithm, registers and packages embedded software, and submits embedded software packages to the software component certification server. The new software, following release, is provided to the service provider upgrade components 203–205 via a wired, wireless, or hybrid wired/wireless network coupling or connection 220, but is not so limited.

The software component distributor 202 of an embodiment is hosted on processing systems of the client device manufacturers. In an alternative embodiment, the software component distributor 202 is hosted on processing systems of a software provider. In another alternative embodiment, the software component distributor 202 is hosted on processing systems of the communication service provider, for example the upgrade components 203–205.

The service provider upgrade components 203–205 are coupled among the software component distributor 202, the client devices 104, and the existing components of the service provider's infrastructure 210–218, including the existing gateway 210 and communication infrastructure 212, billing server 214, logging server 216, and authentication server 218. The software component certification server 203 provides an interface to device manufacturers and, thus, receives new device information on embedded software packages from device manufacturers. The software component certification server 203 also receives software component submission requests from the software component distributor, provides notification of approval/decline of new software packages to submitting upgrade servers, provides disk management for submitted and approved software packages, and repackages and distributes approved software packages to upgrade servers. Furthermore, the software component certification server 203 provides carrier-grade security control over potential intrusion and data tampering during the software component submission process.

The upgrade manager 205, functioning as an interface among the software component certification server 203 and the upgrade server 204, provides a web-based user interface by which wireless carrier system administrators verify and approve an embedded device software component upgrade. Also, the upgrade manager 205 configures software and data packaging for optimal device management, schedules remote change notifications, and controls the update policy monitor system. Moreover, the upgrade manager 205 provides integration with the systems of the existing infrastructure, or back end systems (billing, user database authentication, web portal), thereby providing the workflow to determine authentication, access controls, and their integration into the existing billing 214 and logging 216 servers.

The upgrade server 204 provides capabilities including authenticating, connecting, and communicating with mobile devices to perform embedded software component upgrades. Communication with client devices 104 can occur via wireless connections 212, wired connections, hybrid wired/wireless connections, and other network connections with the client device, as appropriate to the corresponding service provider. In addition, the upgrade server 204 supports existing billing, data collection, and logging services of the service provider.

As an example of communications among the upgrade server 204 and client devices 104, when a delta file is available for transfer to a client device 104 from the upgrade server 204, the server 204 sends a user notification to notify the client device user that there are software components available for updating. The user notification can take the form of a text message via a Short Message Service (SMS) push protocol, Hypertext Transfer Protocol (HTTP), or Wireless Application Protocol (WAP), but is not so limited. Upon receiving confirmation from the handset users, the upgrade server 204 uses the original handset data communication protocol to send the delta file to the requesting handset.

In response to receipt of the confirmation from the handset, the upgrade server 204 authenticates and authorizes the user and/or requesting device, and verifies prerequisite capabilities and limitations of the requesting device. Following authentication the upgrade server 204, as the manager of client device configuration data, identifies the current versions of embedded software components of the requesting device 104, identifies and transfers appropriate delta files to the requesting device 104, logs the status of the upgrade transaction, and reports the results to the upgrade manager 205. An embodiment of the upgrade server 204 includes automatic failure recovery mechanisms. In addition, the upgrade server 204 activates/deactivates the software upgrade service over the air, and notifies remote users of software changes.

With reference to FIG. 1, the upgrade client 130 is embedded in the device memory 300 of the client devices 104, but is not so limited. The upgrade client 130 stores and maintains configuration data of the host device 104, and provides for the maintenance and upgrading of embedded device software components using the file updating algorithm 118. The upgrade client 130 supports a simple user interface and is incorporated into mobile device software. Upon execution, the upgrade client 130 automatically detects the remote change of any embedded software components, notifies users of an embedded software component upgrade, and upgrades a software component based on the carriers and/or users control, as appropriate for a particular service provider. The upgrade client 130 also includes an automatic failure recovery mechanism.

The client device determines the status of numerous device parameters prior to participating in an update procedure. This is done in order to pre-qualify the device for the update procedure, or verify that the condition of the client device is such that the update procedure can be completed once begun. The client device pre-qualification includes determining if the client device is in a cradle or charging mode, if the client device is connected to a serial cable, if the state of battery charge is sufficient to perform the updating process, if the Received Signal Strength Indication (RSSI)

or signal strength is sufficient for the data transfer, and if the targeted EBSC is currently in use.

The upgrade system 200 of an embodiment supports numerous types of software file or component updates via delta file. The file types for which updates are supported include executable files, byte stream files, and data files, but are not so limited. The executable files, or image files, include software files used in the client device to execute tasks, for example the operating system (OS), hardware device drivers, and K Virtual Machine (KVM) files. The byte stream files include files used by other executable files, for example, icon files, logo files, and MP3 files. Data files include files containing personal use data, and handset reference data, for example the calibration configuration files, the Protocol Independent Multicast (PIM) files, and system configuration files.

Figure 3:
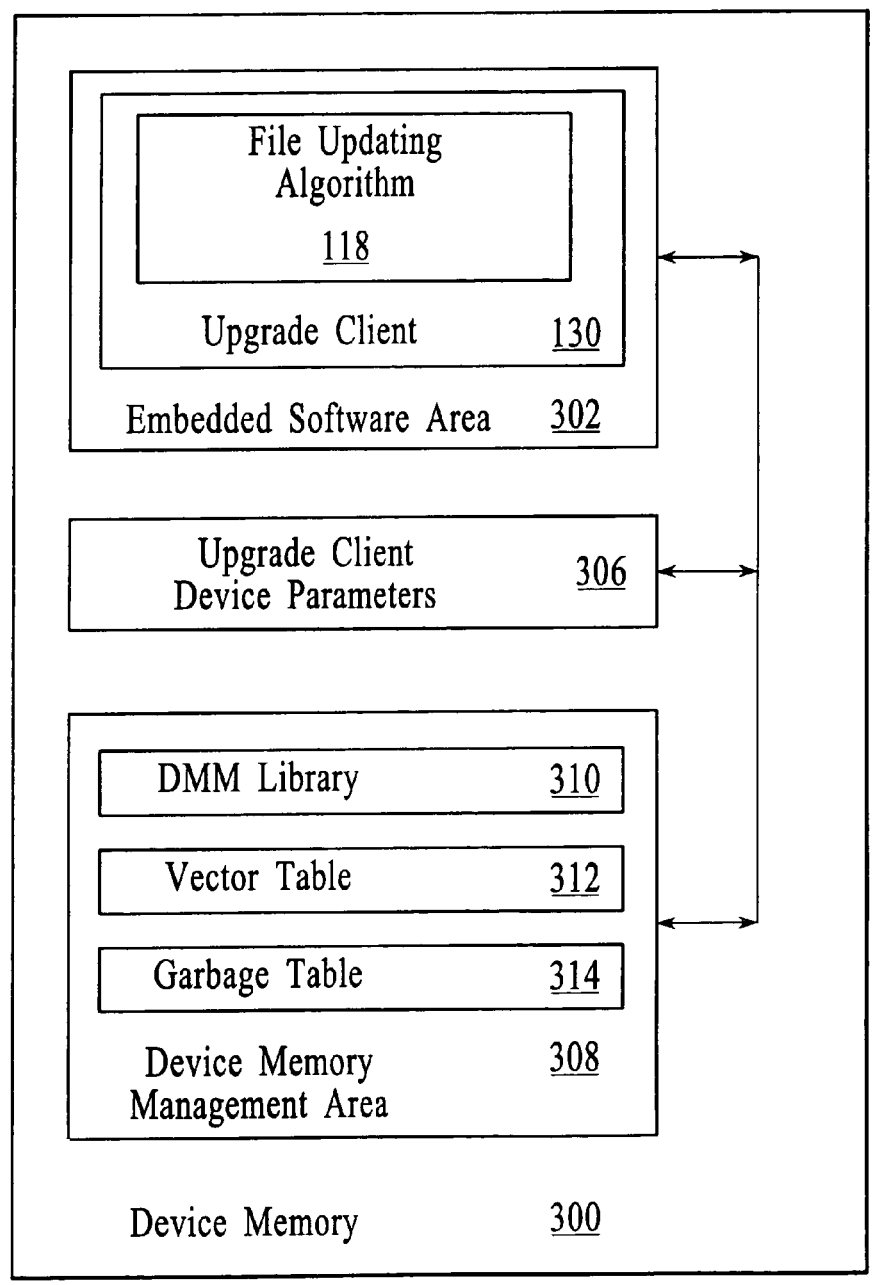
FIG. 3 is a block diagram of the device memory, under an embodiment.

FIG. 3 is a block diagram of the device memory 300, under an embodiment. The device memory 300 of an embodiment is flash ROM, but many types of memory and/or combination of memory types may be used in alternative embodiments of the device memory 300. The device memory 300 includes an embedded software area 302, an area for the upgrade client device parameters 306, and a device memory management area 308. The upgrade client 130 along with the file updating algorithm 118 is stored in the embedded software area 302 of an embodiment. The device memory management area 308 hosts a device memory management (DMM) library 310, a vector table 312, and a garbage table 314, as described in detail below.

Upon receipt of a delta file, or alternatively a new EBSC, the upgrade client 130 controls the revising and updating of files including embedded software, embedded software components (EBSCs), and EBSC groups. The upgrade client uses numerous methods to update EBSCs depending on the file type to be updated and the resources allocated by the client device manufacturer to support these updates. These update methods include but are not limited to the following, as described in detail in the Related Applications: updating the operating system (OS), communication protocol and other critical software components using reserved ROM; updating the OS, communication protocol and other critical components using reserved RAM; updating the communication protocol in the absence of reserved ROM or RAM; and single-line updates of non-critical EBSCs.

The update methods of an embodiment include non-critical component updates and critical component updates. These categories are based on the usage of the software components of the client device targeted for update, and are described further below.

Figure 4:
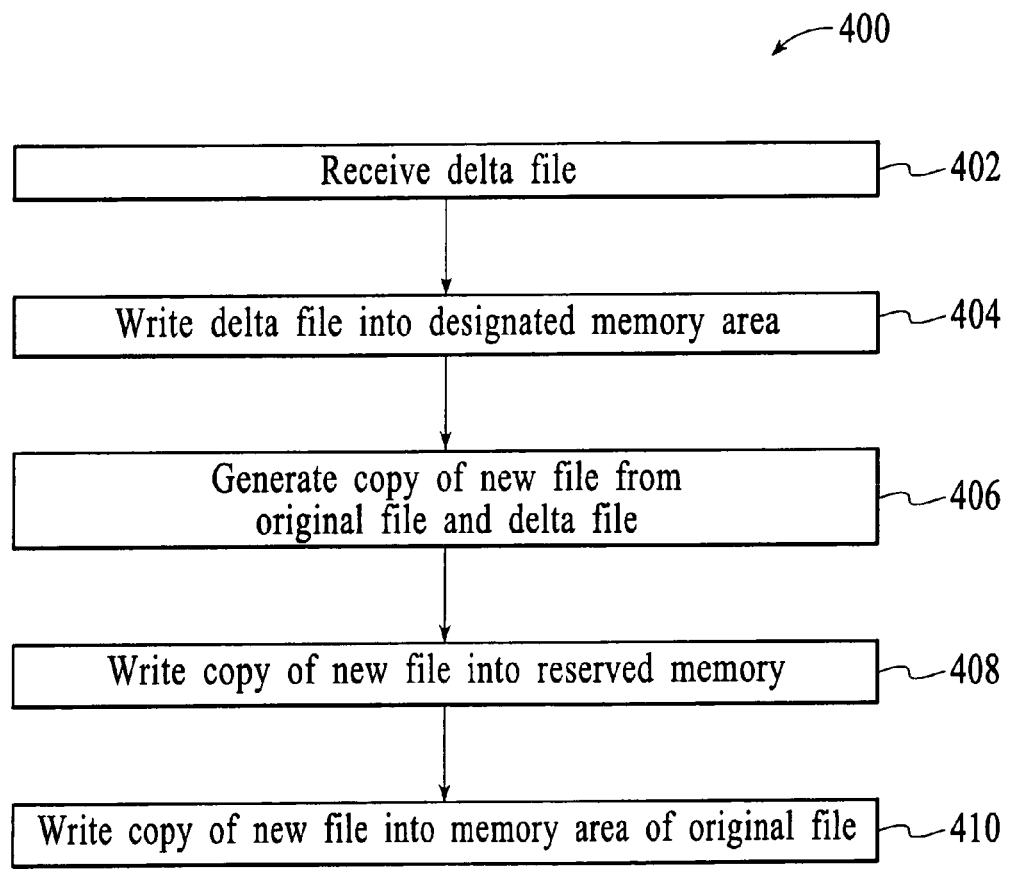
FIG. 4 is a flow diagram of a non-critical component update, under an embodiment.

Non-critical components include embedded software components (EBSCs) that are easily recovered over the air following a failure during the update process. Examples of non-critical components include browsers and KVM files, but are not so limited. FIG. 4 is a flow diagram 400 of a non-critical component update, under an embodiment. When updating with a delta file, the client device receives the delta file from an upgrade server via a network connection, at block 402. The delta file, upon receipt in the client device, is written into a designated area of device memory, at block 404, for example, RAM and/or ROM storage. The upgrade client of the client device then generates a copy of the new file or EBSC from the original file or EBSC using the delta file, at block 406. The copy of the new file is written into reserved RAM or ROM, as appropriate, at block 408. At block 410, the copy of the new file is subsequently written from reserved memory into the memory locations that contain the original file or EBSC.

Critical components include software components used in the update procedure or the EBSCs critical to device operation. Further, critical components include EBSCs that are not easily recovered over the air following a failure during the update process. Examples of critical components include the operating system files, protocol stacks, the upgrade client files, communication libraries, and display or LCD driver files, but are not so limited. The update procedure differs slightly between these two categories.

Figure 5:
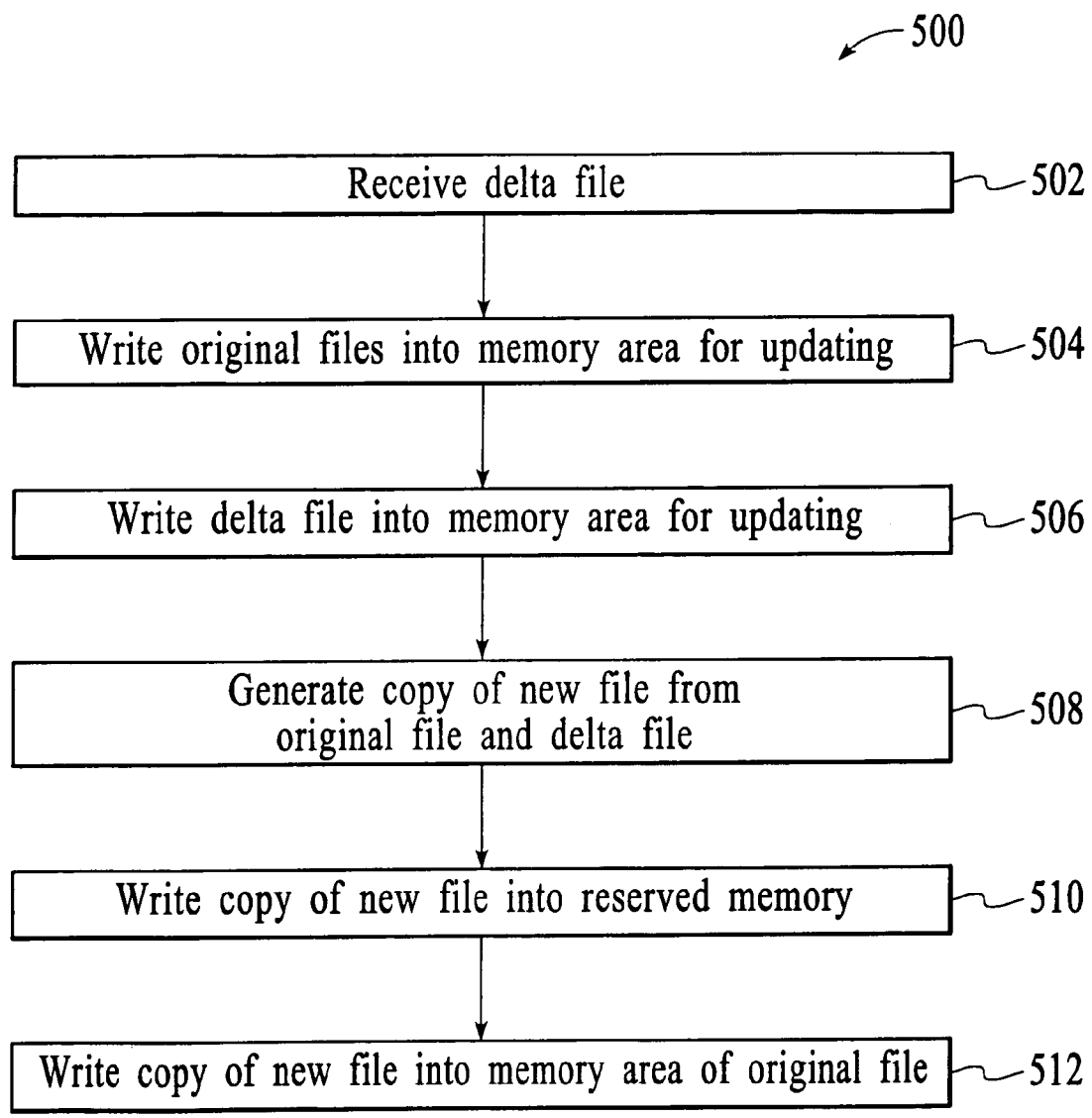
FIG. 5 is a flow diagram of a critical component update, under an embodiment.

FIG. 5 is a flow diagram 500 of a critical component update, under an embodiment. When performing the update using a delta file, the client device receives the delta file from the upgrade server via a network connection, at block 502. As described above, the delta file can include file or EBSC upgrades of executable, byte stream, and data files. The wireless network of an embodiment is that of the cellular service provider, but is not so limited.

Upon receipt of the delta file, generally, the original files or EBSCs targeted for updating are copied from the flash ROM of the client device into a memory area designated for use during the update process, at block 504, for example RAM and/or ROM storage as appropriate. The client device allocates this designated memory area for use in storing the updating software components. The delta file is also written into the memory area designated for use during the update process, at block 506.

The upgrade client of the client device then uses the hosted copy of the original file along with the delta file to generate a copy of the new file, at block 508. The copy of the new file is written into a pre-specified memory area of the client device, for example reserved memory of the client device, at block 510. This process is repeated as necessary.

Following generation, the copy of the new file is written from reserved memory into the original memory locations containing the original file, at block 512. When the size of the new file is the same as or smaller than that of the original file, the new file is written into the memory locations of the original file, thereby replacing the original file.

As described above, revision of files involves the writing of new and updated EBSCs to memory locations of the host device. Often, the new EBSC will not be exactly the same size or have exactly the same start address as the original EBSC it replaces. The upgrade client of an embodiment provides device memory management options including static addressing and dynamic addressing of upgradeable EBSCs to accommodate writing of the new EBSC regardless of the EBSC size or start address.

The static addressing of upgradeable EBSCs generally provides for changing the size of the EBSC or EBSC group during updates, using reserved memory areas, while the start address remains unchanged. Therefore, when using static addressing the entire embedded software (EEBS) file is rewritten if the start address of an EBSC or EBSC group requires changing, but the embodiment is not so limited.

The dynamic addressing of upgradeable EBSCs, while allowing for more advanced memory management, generally supports modification of both the start addresses and sizes of EBSCs and EBSC groups during each update. The upgrade client of an embodiment supports dynamic addressing using interactions among a set of application program or programming interfaces (APIs) and at least one data table. As such, dynamic addressing increases the efficiency of ROM utilization and device memory map design while supporting faster update processing with a lower probability of update failures. Static and dynamic addressing are described in further detail below.

The static addressing of an embodiment includes two alternatives, one of which includes a reserve memory allocation for each upgradeable EBSC, and one of which includes a reserve memory allocation for particular groups of EBSCs. The reserve memory allocations modify the memory allocation for each EBSC or EBSC group to accommodate software updates. Therefore, there will be additional ROM reserved to accommodate future growth of the software, but the additional memory is not limited to ROM.

Figure 6:
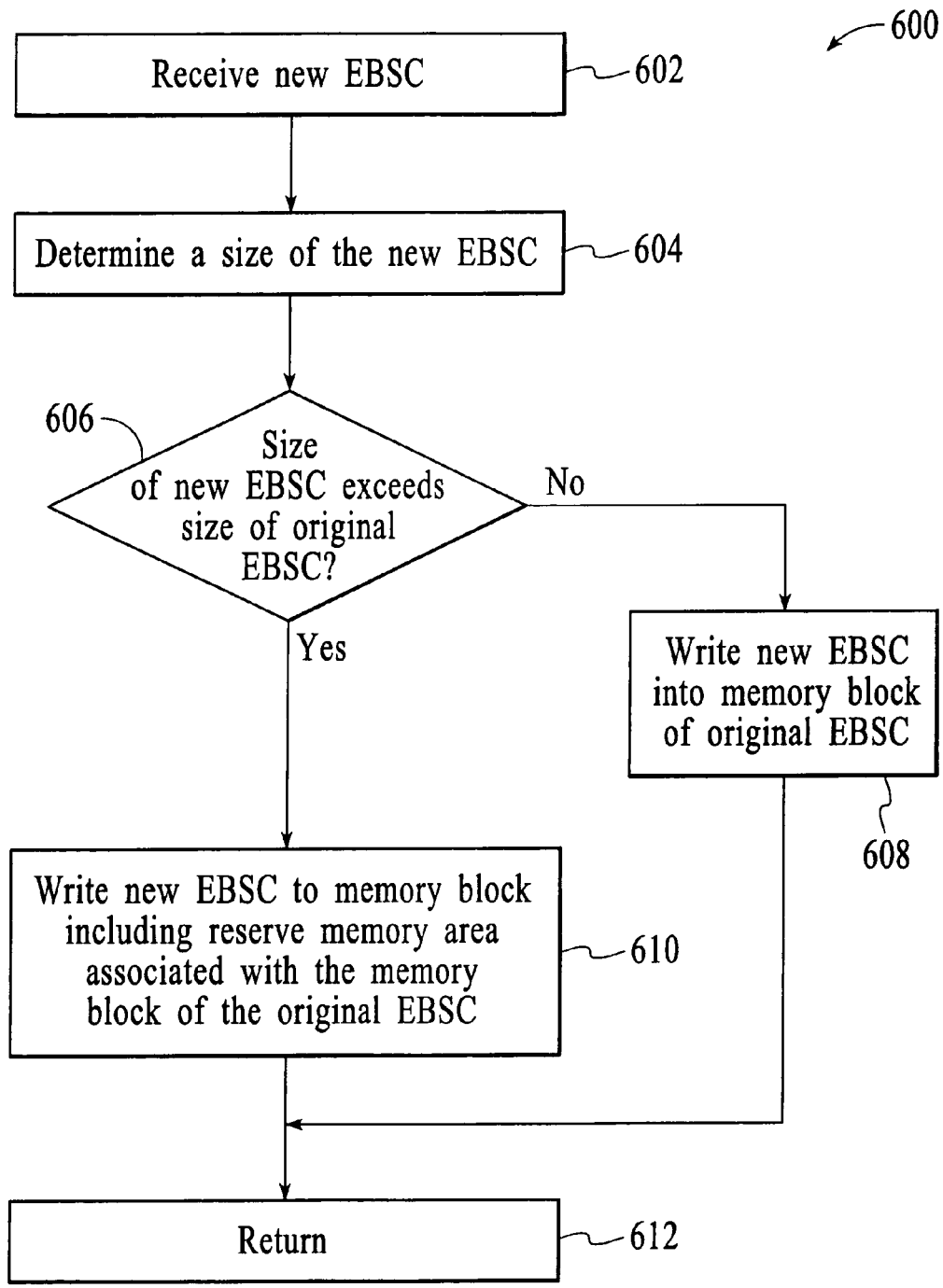
FIG. 6 is a flow diagram of static addressing using reserve memory allocation for each upgradeable EBSC, under an embodiment.

FIG. 6 is a flow diagram 600 of static addressing using reserve memory allocation for each upgradeable EBSC, under an embodiment. In operation, the upgrade client receives a new EBSC, at block 602. The new EBSC may be received from the software component distributor, or generated by the upgrade client from the original EBSC and the delta file. The upgrade client determines, at block 604, a size of the new EBSC. The upgrade client determines, at block 606, whether the size of the new EBSC exceeds that of the corresponding EBSC it replaces. When the new EBSC size does not exceed that of the original EBSC, the upgrade client reserves, and subsequently writes the new EBSC to, the memory block storing the original EBSC, at block 608. When the new EBSC size does exceed that of the original EBSC, the upgrade client reserves, and eventually writes the new EBSC to, the memory block and associated reserve memory area storing the original EBSC, at block 610. Following writing of the new EBSC, operation returns to receive additional new EBSCs, at block 612.

Figure 7:
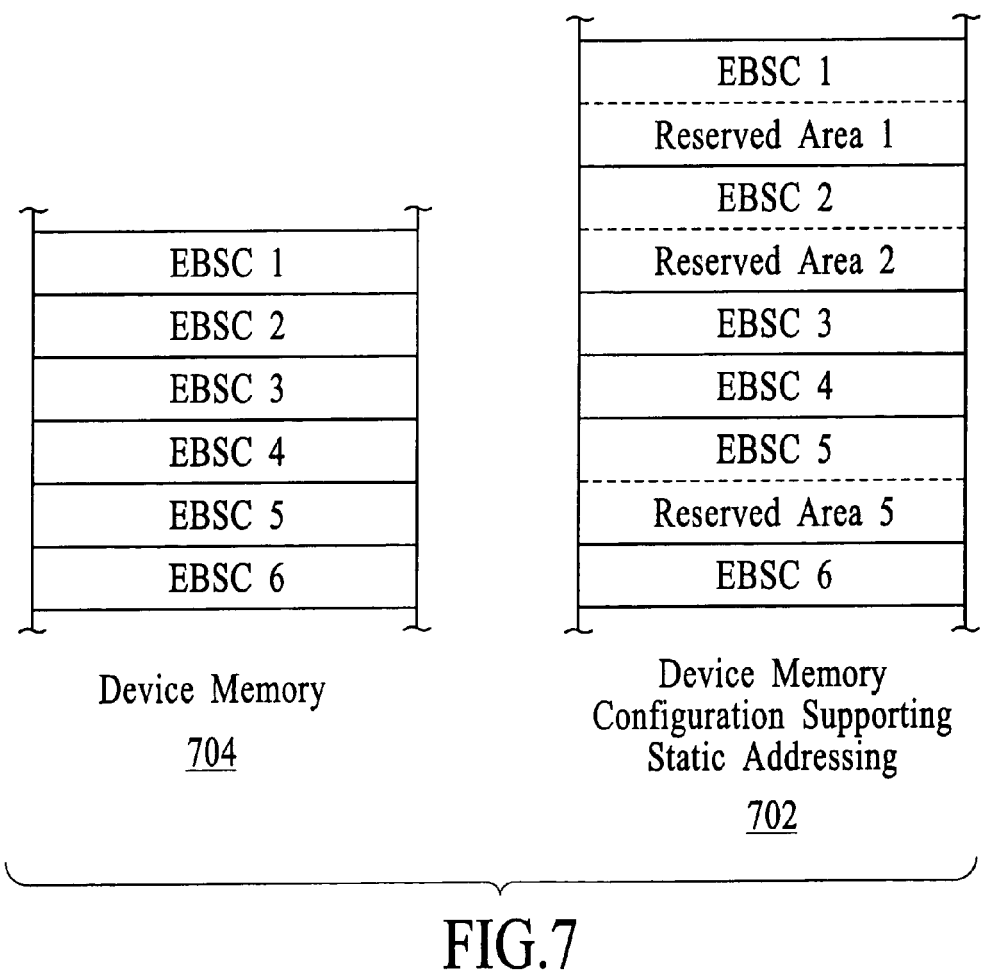
FIG. 7 is a block diagram of a portion of a host device memory configured to support static addressing memory management, under the embodiment of FIG. 6.

FIG. 7 is a block diagram of a portion of a host device memory 702 configured to support static addressing memory management, under the embodiment of FIG. 6. In comparison, a portion of the host device memory 704 that is not configured to support static addressing is shown. The memory 702 supporting static addressing includes reserve memory areas for each upgradeable EBSC. In this example, upgradeable EBSCs are identified at the time of device manufacture. A reserve memory area is then provided that corresponds to each upgradeable EBSC. While the reserve memory areas are shown as co-located with the corresponding EBSC, they may be located or distributed anywhere in device memory. In the interest of minimizing the amount of reserved memory, reserved memory areas are not provided for non-upgradeable EBSCs, but the embodiment is not so limited.

Continuing with this example, the upgradeable EBSCs are identified as EBSC 1, EBSC 2, and EBSC 5, and reserved memory areas 1, 2, and 5 are provided for each of these upgradeable EBSCs, respectively. Each reserved memory area 1, 2, and 5 is of a size determined by the device manufacturer. Future upgrades and revisions to the upgradeable EBSCs use the corresponding reserved memory area when the upgrade/revision causes the size of the upgraded EBSC to exceed the size of the original EBSC, as described above.

Figure 8:
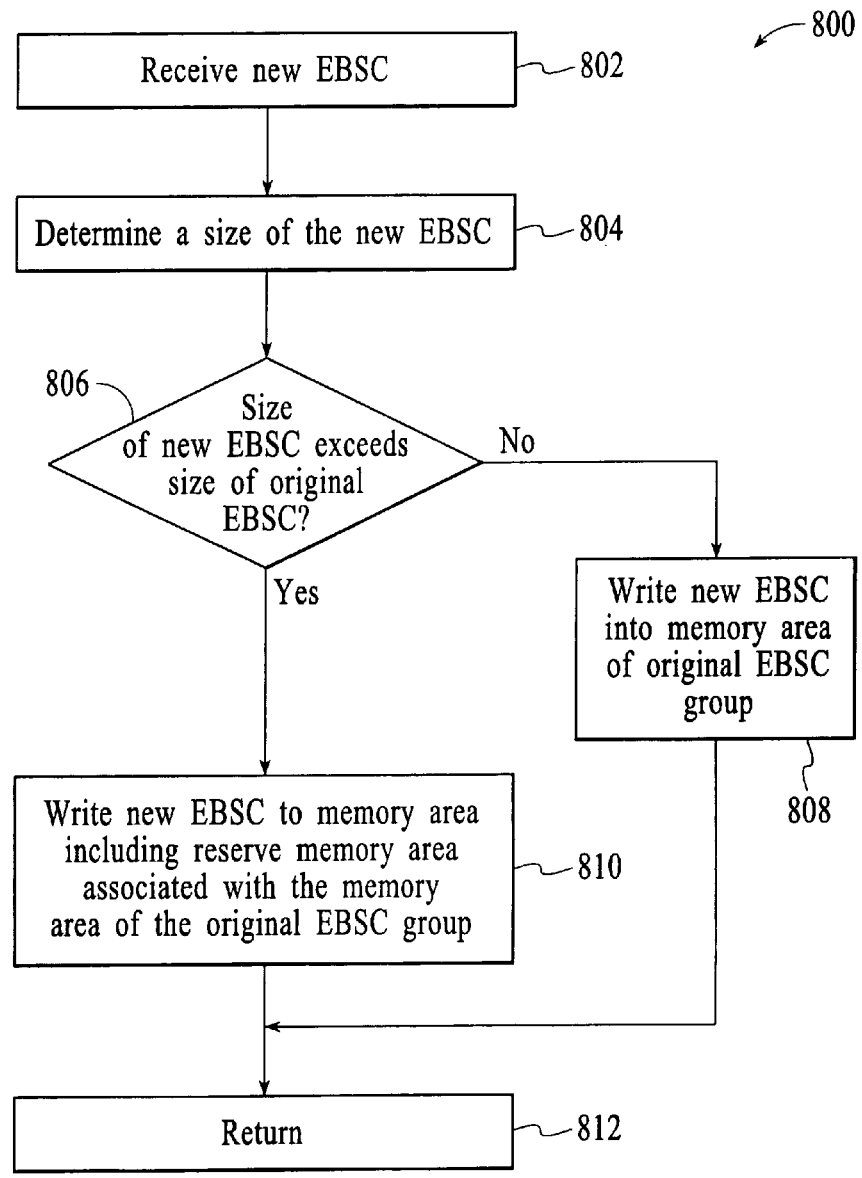
FIG. 8 is a flow diagram of static addressing using reserve memory allocation for groups of upgradeable EBSCs, under an embodiment.

FIG. 8 is a flow diagram 800 of static addressing using reserve memory allocation for groups of upgradeable EBSCs, under an embodiment. In operation, the upgrade client receives a new EBSC, at block 802. Again, the new EBSC may be received from the software component distributor, or generated by the upgrade client from the original EBSC and the delta file. The upgrade client determines, at block 804, a size of the new EBSC. The upgrade client determines, at block 806, whether the size of the new EBSC exceeds that of the corresponding EBSC it replaces. When the new EBSC size does not exceed that of the original EBSC, the upgrade client reserves, and subsequently writes the new EBSC to, the memory block storing the EBSC group that includes the corresponding original EBSC, at block 808. When the new EBSC size does exceed that of the original EBSC, the upgrade client reserves, and eventually writes the new EBSC to, the memory block and associated reserve memory area storing the original EBSC, at block 810. Following writing of the new EBSC, operation returns to receive additional new EBSCs, at block 812.

Figure 9:
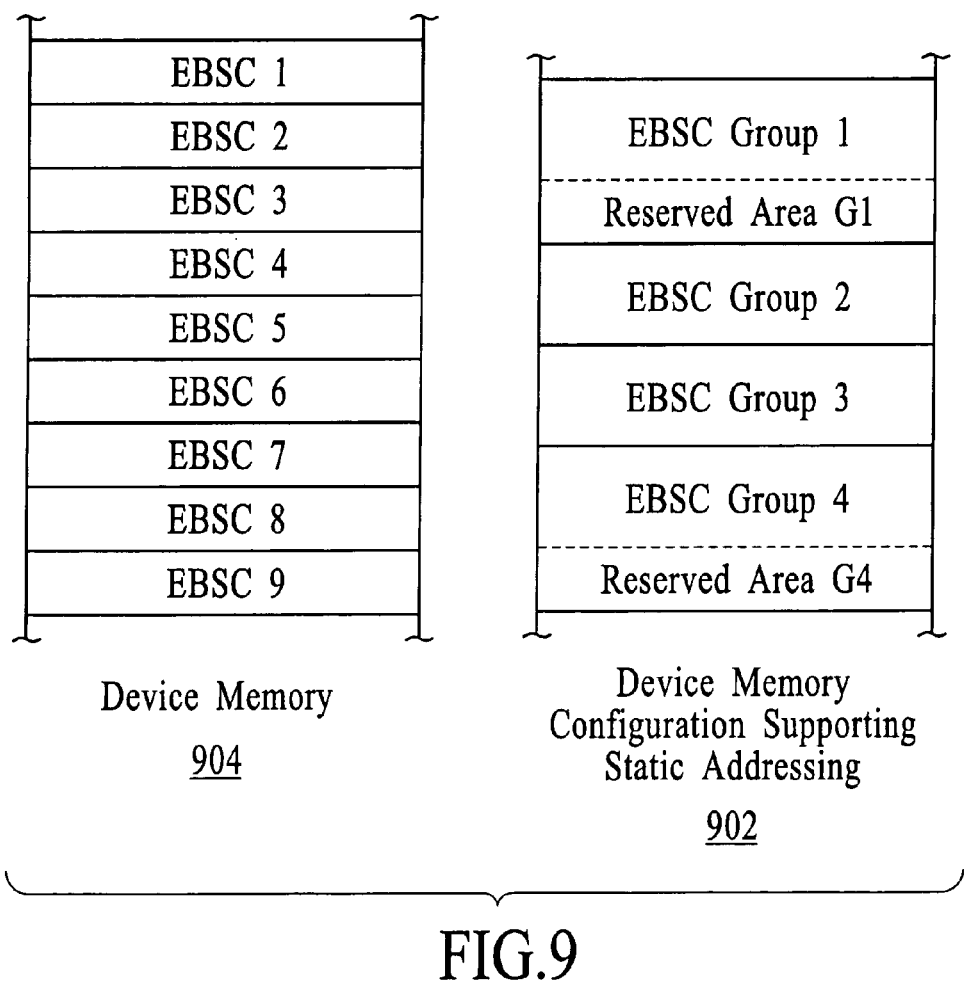
FIG. 9 is a block diagram of a portion of a host device memory configured to support static addressing memory management, under the embodiment of FIG. 8.

FIG. 9 is a block diagram of a portion of a host device memory 902 configured to support static addressing memory management, under the embodiment of FIG. 8. In comparison, a portion of the host device memory 904 that is not configured to support static addressing is shown. The host memory 902 supporting static addressing includes reserve memory areas for pre-specified groups of upgradeable EBSCs. In this alternative, upgradeable EBSCs are identified at the time of device manufacture. In this example, EBSCs 1, 2, 4, 5, and 8 are upgradeable.

The device manufacturer groups the upgradeable EBSCs using at least one of a number of factors. For example, EBSCs with similar update frequencies may form a group. Also, EBSCs with similar probabilities of being updated/revised can form a group. Furthermore, EBSCs of related or interworking functions may form a group. The following groupings are made for purposes of this example: EBSCs 1, 4, and 5 form EBSC group 1; EBSCs 3 and 7 form group 2; EBSCs 6 and 9 form group 3; and EBSCs 2 and 8 form group 4.

Following grouping, the device manufacturer provides a reserve memory area corresponding to each updateable EBSC group. While the reserve memory areas are shown as co-located with the corresponding EBSC groups, they may be located anywhere in device memory. While non-upgradeable EBSCs are also placed in one or more groups, no reserved area is provided in the interest of minimizing the amount of reserved memory, but the embodiment is not so limited.

In this example, the upgradeable EBSC groups are identified as EBSC Group 1 and EBSC Group 4, and reserved memory areas G1 and G4 are provided for each of these upgradeable EBSC groups, respectively. Each reserved memory area G1 and G4 is of a size determined by the device manufacturer. Future upgrades and revisions to the upgradeable EBSC groups use the corresponding reserved memory area when the upgrade/revision causes the size of the upgraded EBSC group to exceed the size of the original EBSC group.

The rewriting of the EBSCs or EBSC groups described above can result in changes in the starting addresses of the subroutines within the file that includes the rewritten EBSC or EBSC group. Any changes in subroutine starting addresses result in changes to the corresponding call addresses by which other subroutines of the host device access the rewritten subroutines. Therefore, in an embodiment, the upgrade client supports upgrading of the call addresses corresponding to any rewritten EBSCs or EBSC groups. This call address upgrade includes rewriting any blocks in the host device memory that include call addresses corresponding to subroutines in rewritten EBSCs or EBSC groups. As these call address changes typically involve only a few bytes, upgrading only the blocks including the call addresses is found to be more efficient than updating the EBSCs containing the call addresses, but the embodiment is not so limited.

Figure 10:
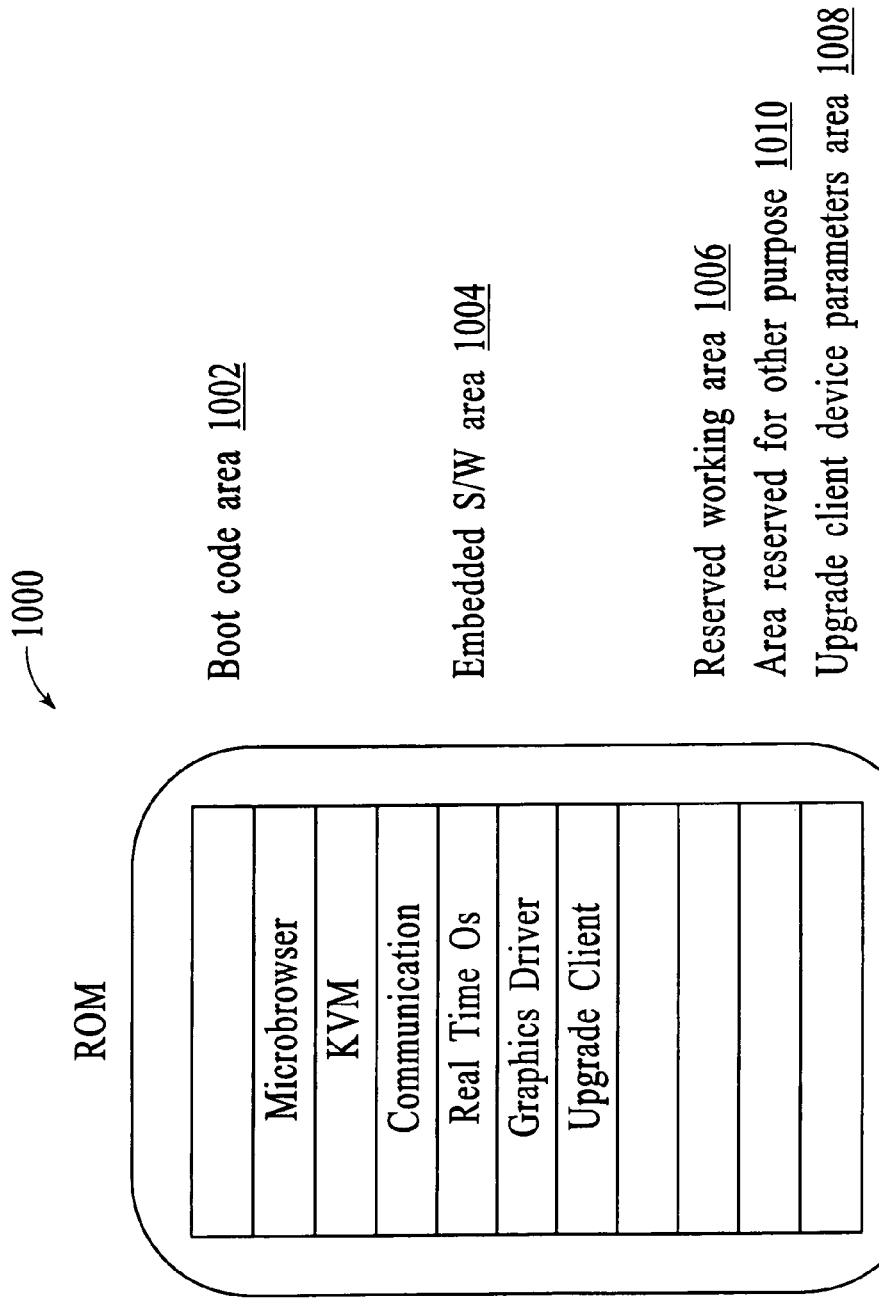
FIG. 10 is a block diagram of a client device ROM map supporting static addressing, under an embodiment.

FIG. 10 is a block diagram of a client device ROM map 1000 supporting static addressing, under an embodiment. The ROM includes the following areas, but is not so limited:

boot code area 1002, embedded software area 1004, EBSC working memory area 1006, upgrade client device parameter area 1008, and at least one area reserved 1010 for unspecified purposes.

The boot code area 1002 stores the device booting sequence code. The embedded software area 1004 stores embedded software of the client device. The embedded software includes, for example, software of the browser, K Virtual Machine (KVM), communication library, real time OS, graphics driver, and upgrade client, but the embodiment is not so limited. The memory allocation for each upgradeable EBSC or EBSC group is modified to accommodate software updates, as described above. Therefore, there will be additional ROM reserved to accommodate future growth of the software. The additional reserved ROM is approximately 5%–20% of the size of the initial version of the corresponding EBSC or EBSC group, but is not so limited.

The EBSC working memory area 1006 stores new versions of an EBSC or EBSC group temporarily after they are generated by the upgrade client and before the new versions are written to the memory locations of the embedded software area 1004 currently occupied by the original versions of the EBSC or EBSC group. The estimated size of the working area 1006 is at least the size of the largest of all EBSCs or EBSC groups that use this memory area, including critical and non-critical components.

The upgrade client device parameter area 1008 stores client device configuration data and parameters specific to the upgrade client. The estimated size of this area 1008 corresponds to the number of upgradeable EBSCs related to device configuration hosted on the client device, but is not so limited.

Figure 11:
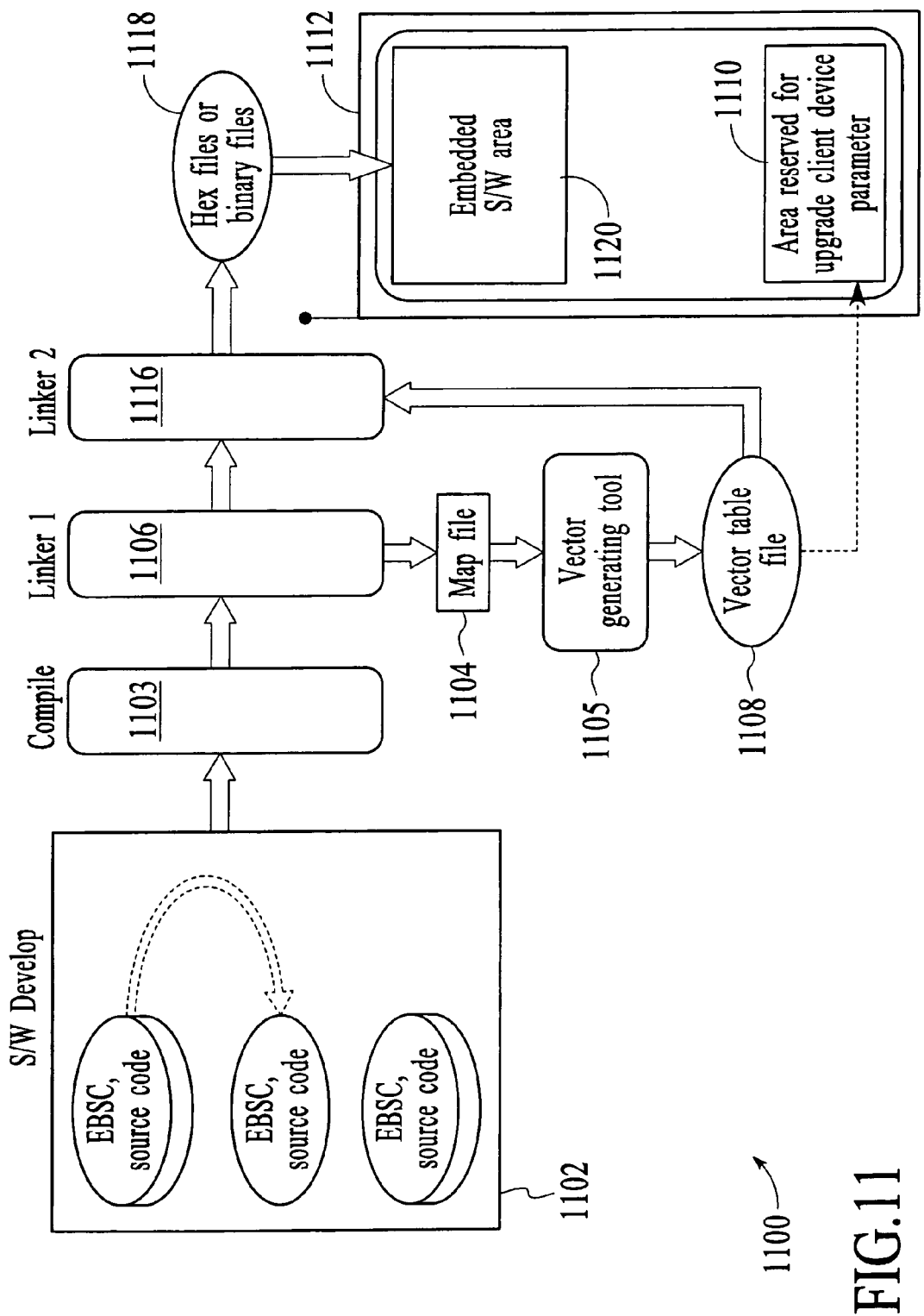
FIG. 11 is a block diagram of an embedded software development and deployment process using static addressing, under an embodiment.

FIG. 11 is a block diagram of an embedded software development and deployment process 1100 using static addressing, under an embodiment. This diagram depicts the process from EBSC development by the software component distributor 1102, for example, to device ROM initialization using an upgrade client of an embodiment with static addressing-based device memory management.

Components of the software component distributor 1102 receive source code of the new EBSCs, and compile 1103 the new EBSC source code. The compiling 1103 couples the resulting EBSC object code to the linkers 1106 and 1116 which, as part of the registration of the new EBSC, generate a new hex file (text) or binary file 1118 from the new EBSC object code. The new hex file corresponds to the new EBSC.

In supporting static addressing, the software component distributor or service provider modifies the original map file to insert additional memory for each upgradeable EBSC. In an embodiment, linker 1106 generates the modified map file 1104. When EBSC grouping is used, the original map file is modified to group EBSCs and insert additional memory for each upgradeable EBSC group. This modification of the map file 1104 includes editing the link files using linker 1106 to insert the empty file or group together with the corresponding object files.

A vector generating tool 1105 generates a vector table file 1108 from the modified map file 1104. The vector table file 1108 is downloaded into the reserved ROM area 1110 for upgrade client device parameters in the client device 1112. With reference to FIG. 1, the upgrade client 130 maintains the vector table 1108, which generally remains unchanged unless the entire embedded software (EEBS) is rewritten. The linker 1116 also uses the modified map file 1104 to generate the new hex or binary file 1118. Further, the linker 1116 specifies or generates a list of hex file/map file path pair associations. The hex file 1118 is downloaded into the embedded software area 1120 of the client device 1112, but may be downloaded into other areas of the client device memory in alternative embodiments.

While the static addressing described above reduces the host device processing times and enables updating of critical software components, it does not accommodate all upgrades and revisions. In addition, the use of static addressing necessitates rewriting of the entire device memory when a rewrite of any EBSC will exceed the size of the corresponding reserved memory area. Consequently, embodiments use dynamic addressing as an alternative to static addressing.

Dynamic addressing allows for electronic file updates and revisions in which the size of the new file version exceeds that of the original file version. In supporting dynamic addressing, the upgrade client of an embodiment effectively manages the device memory during both the file update process and the function call process in which the main program calls functions including updated EBSCs.

In performing memory management using dynamic addressing, the upgrade client identifies and reserves memory blocks large enough to accommodate new software components by performing sequential searches of host device memory areas including at least one first and second memory area. When the new component size exceeds that of available blocks of the searched memory areas, the upgrade client rewrites a first memory area to eliminate unused memory blocks, reapportions the first and second memory areas, writes the new component to the second memory area, and updates a vector table, as described below.

Figure 12:
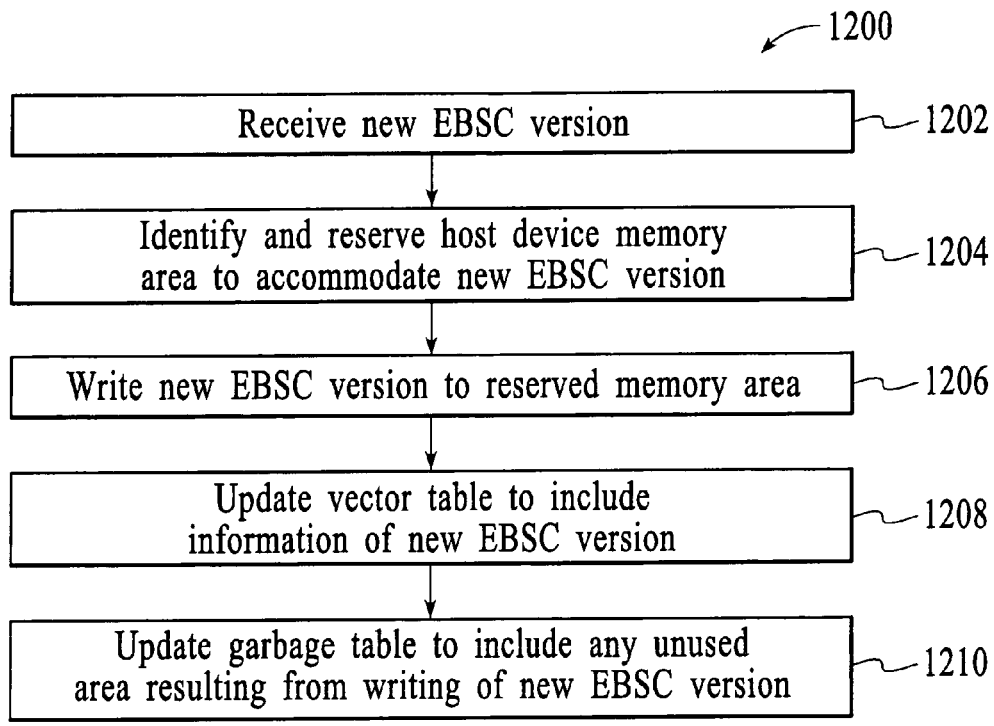
FIG. 12 is a flow diagram for upgrading an EBSC or EBSC group using dynamic addressing, under an embodiment.

FIG. 12 is a flow diagram 1200 for upgrading an EBSC or EBSC group using dynamic addressing under an embodiment. The upgrade client receives the new EBSC version, at block 1202. The new EBSC version is generated from the original EBSC version and the corresponding delta file or, alternatively, is received from the software component distributor. A memory area is identified and reserved in the client device to accommodate storage of the new EBSC version, at block 1204. At block 1206, components of the upgrade client write the new EBSC version to the reserved memory area. Updates are made to the vector table, at block 1208, in order to make any necessary changes to the information of the vector table resulting from the new EBSC version. Also, at block 1210, updates are made to the garbage table to reflect any changes in the unused memory area resulting from writing of the new EBSC version.

To access software components in a host device using dynamic addressing, the upgrade client receives a function call from the main program of the host device including identification information of corresponding software files, reads a start address of the corresponding software files from the vector table, and generates a call for the corresponding software files. As such, when a first EBSC calls a second EBSC, the upgrade client changes the function calling sequence so that, instead of calling the second EBSC directly using a static address, the first EBSC calls an API of the upgrade client using a static address. The called API converts the received call to a call to the second EBSC using the corresponding static address and arguments of the runtime vector table.

Figure 13:
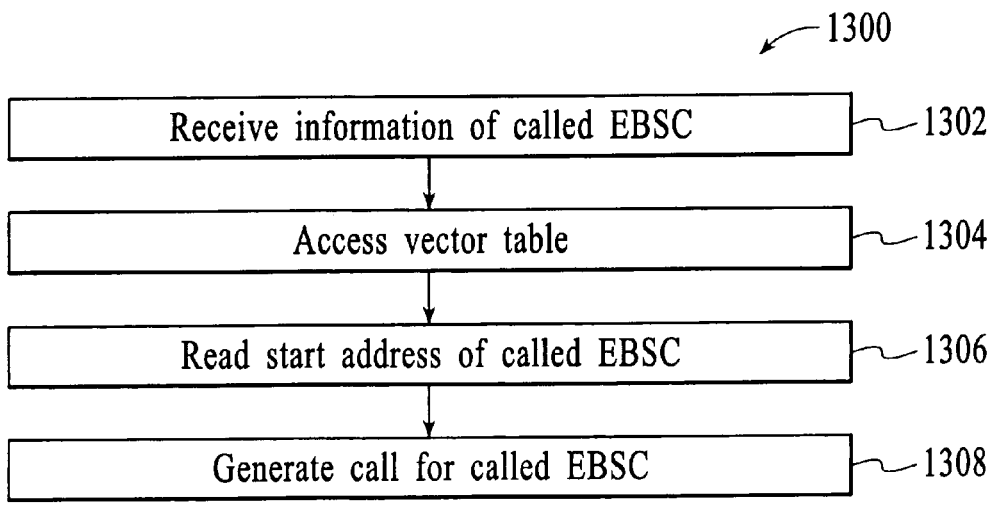
FIG. 13 is a flow diagram of a function call using dynamic addressing, under an embodiment.

FIG. 13 is a flow diagram 1300 of a function call using dynamic addressing, under an embodiment. The main program of the host device supports user-requested functions using EBSCs stored in the host device memory. When a function is requested by a user, an EBSC of the main program of the host device calls the EBSCs associated with the particular function by directly calling components of the upgrade client using a static address. In response to the call, the upgrade client receives information from the main program that includes a function or EBSC identification and the arguments to the function, at block 1302. The upgrade client accesses the vector table, at block 1304, which includes entries for each EBSC available to the main program along with corresponding start addresses of the EBSC. The upgrade client reads the start address and associated arguments from the vector table, at block 1306. Using the start address information along with the information of the called EBSC received from the main program, the upgrade client generates a call for the actual function, and the corresponding EBSC, along with all the received arguments, at block 1308.

Figure 14:
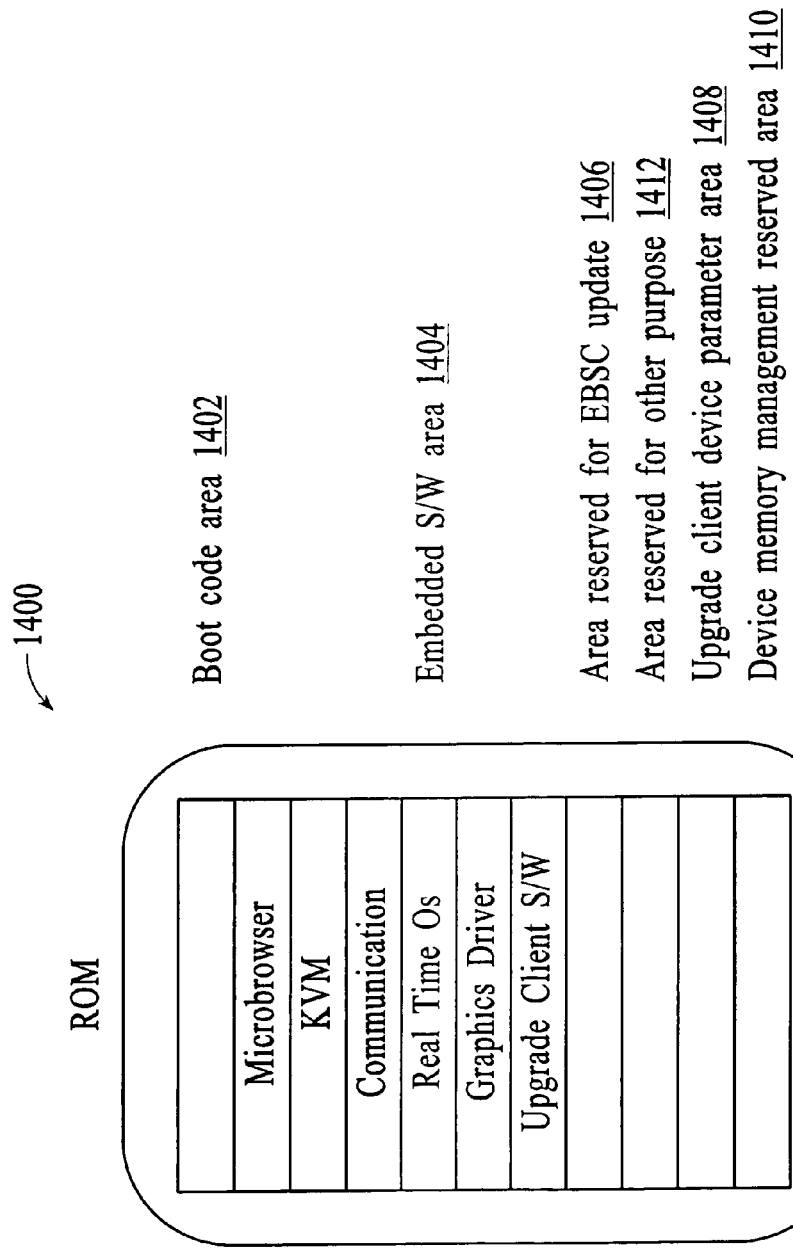
FIG. 14 is a block diagram of a client device ROM map supporting dynamic addressing, under an embodiment.

FIG. 14 is a block diagram of a client device ROM map 1400 supporting dynamic addressing, under an embodiment. The ROM includes the following areas, but is not so limited: boot code area 1402, embedded software area 1404, EBSC update area 1406, upgrade client device parameter area 1408, device memory management area 1410, and at least one area 1412 reserved for unspecified purposes. Each of these memory areas is described below, but alternative embodiments can use many different area configurations as recognized by one skilled in the art.

The boot code area 1402 stores the device booting sequence code. The embedded software area 1404 stores embedded software of the client device. The embedded software includes, for example, software of the browser, KVM, communication library, real time OS, graphics driver, and the upgrade client, but is not so limited.

The EBSC update area 1406 stores new versions of embedded software components. The estimated size of this area 1406 will vary among devices. Generally, however, the EBSC update area 1406 will be approximately 10%–20% of the size of the embedded software area 1404.

The upgrade client device parameter area 1408 stores client device configuration data and parameters specific to the upgrade client. The estimated size of the upgrade client device parameter area 1408 corresponds to the number of upgradeable EBSCs related to device configuration hosted on the client device, but is not so limited.

The device memory management area 1410 stores memory parameters, a vector table and a garbage entry table, but is not so limited. The estimated size of this area 1410 corresponds to the number of upgradeable EBSCs related to device memory management hosted on the client device.

The memory parameters of the device memory management area 1410 include the ROM number, start address, and size of the reserved ROM area for device memory management, and the start address and size of the next available memory in the reserved ROM area for device memory management 1410. The memory parameters also include the size of the vector table and the garbage entry table, and the number of valid entries in the garbage entry table. The vector table includes the EBSC identification, ROM number, start address, and size of the upgradeable EBSCs. The garbage entry table includes the ROM number, start address, and size of all garbage entries.

Figure 15:
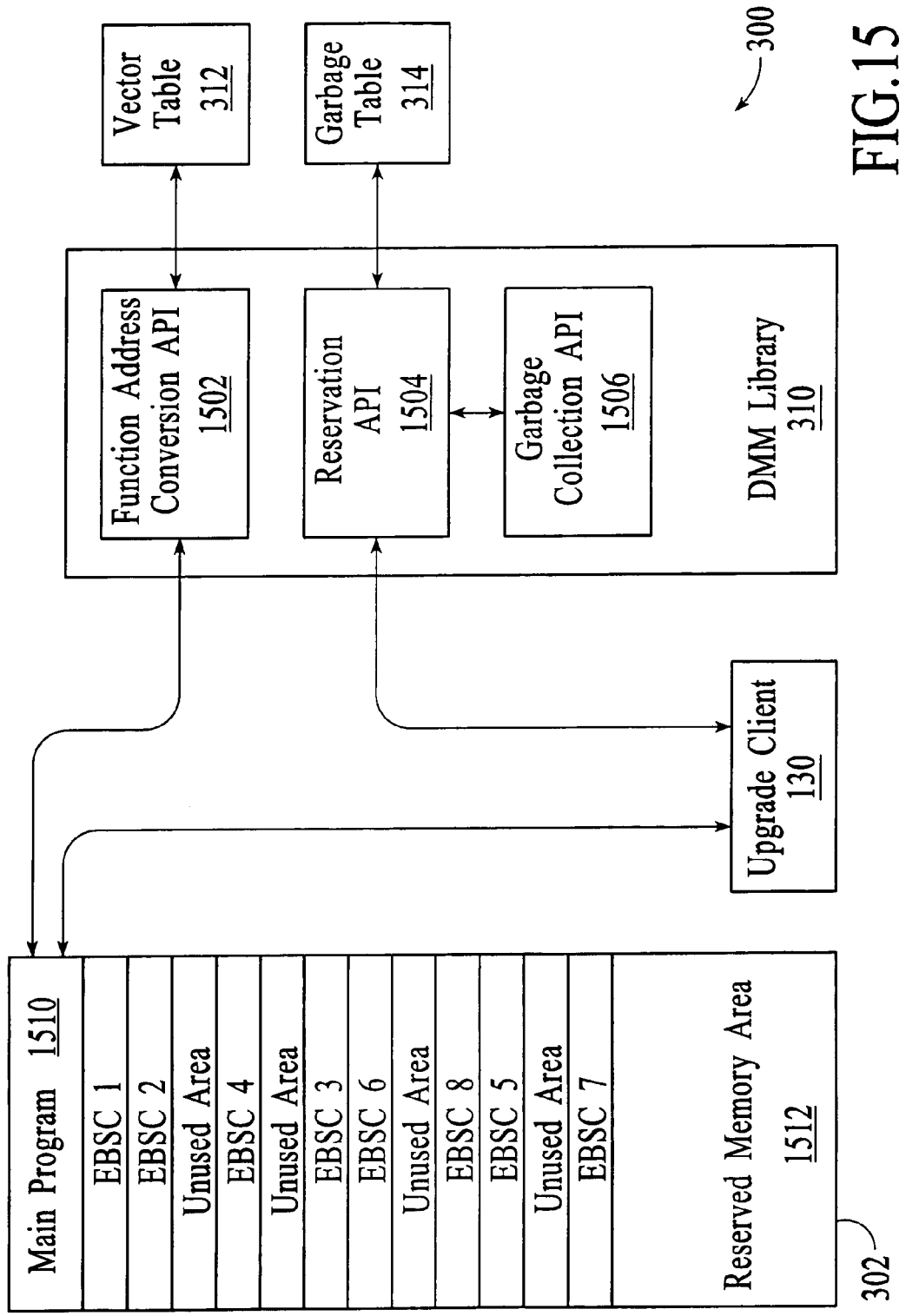
FIG. 15 is a block diagram of a host device memory showing an example of interaction among components of the memory including the upgrade client, the embedded software area, the DMM library, the vector table, and the garbage table, under the embodiments of FIGS. 3 and 14.

FIG. 15 is a block diagram of the device memory 300 showing an example of interaction among components of the memory including the upgrade client 130, the embedded software area 302, the DMM library 310, the vector table 312, and the garbage table 314, under the embodiments of FIGS. 3 and 14. The DMM library 310 includes three APIs 1502–1506. These APIs 1502–1506 are for use in manipulating the reserved ROM area for device memory management, the reserved memory for EBSCs, and the reserved area for EBSC update. These APIs include an API for function address conversion 1502, an API for reservation of a new version of an EBSC 1504, and an API for garbage collection 1506, each of which are described below.

The function address conversion API 1502 generates calls from the host device main program 1510 for EBSCs associated with particular host device functions, as described above with reference to FIG. 13. The main program 1510 of the host device calls an EBSC associated with a particular function by directly calling the function address conversion API 1502. The direct call of the API 1502 is made instead of a direct call of the EBSC. At the time of the call, the function address conversion API 1502 receives information from the main program 1510 that includes function identification information and the arguments to the function.

In response to the call, the function address conversion API 1502 accesses the vector table 312. The vector table 312 includes an entry for each function available to the main program 1510 along with the corresponding start address of the function in the device memory 302. The function address conversion API 1502 reads the start address of the function requested by the main program 1510 from the vector table 312 and, using the start address information along with the information of the called EBSC received from the main program 1510, generates a call for the actual function along with all the received arguments.

Figure 16:
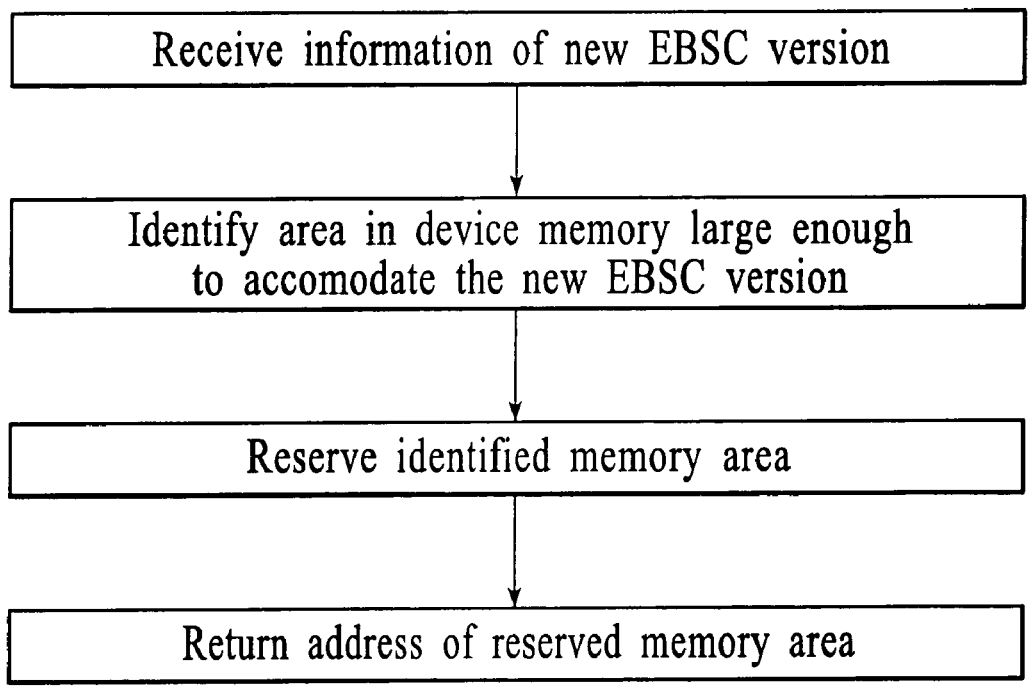
FIG. 16 is a flow diagram for reserving memory areas to accommodate new versions of an EBSC using the reservation API, under an embodiment.

The upgrade client 130 of an embodiment uses the API for reservation of a new version of an EBSC 1504, referred to herein as the reservation API 1504, to locate and reserve areas in memory to accommodate new versions of EBSCs or EBSC groups. With reference to FIG. 15, the reservation API 1504, when called by the upgrade client 130, receives identification information for the new EBSC version, information that includes the file size of this new version. The file size of the new EBSC version is the size of the area that is to be reserved in the device ROM 302 to store the new EBSC version. The reservation API 1504 locates an appropriate area in memory 302 and returns the start address of the requested reservation area upon successfully reserving the memory area. FIG. 16 is a flow diagram 1600 for reserving memory areas to accommodate new versions of an EBSC using the reservation API 1504, under an embodiment.

Figure 17:
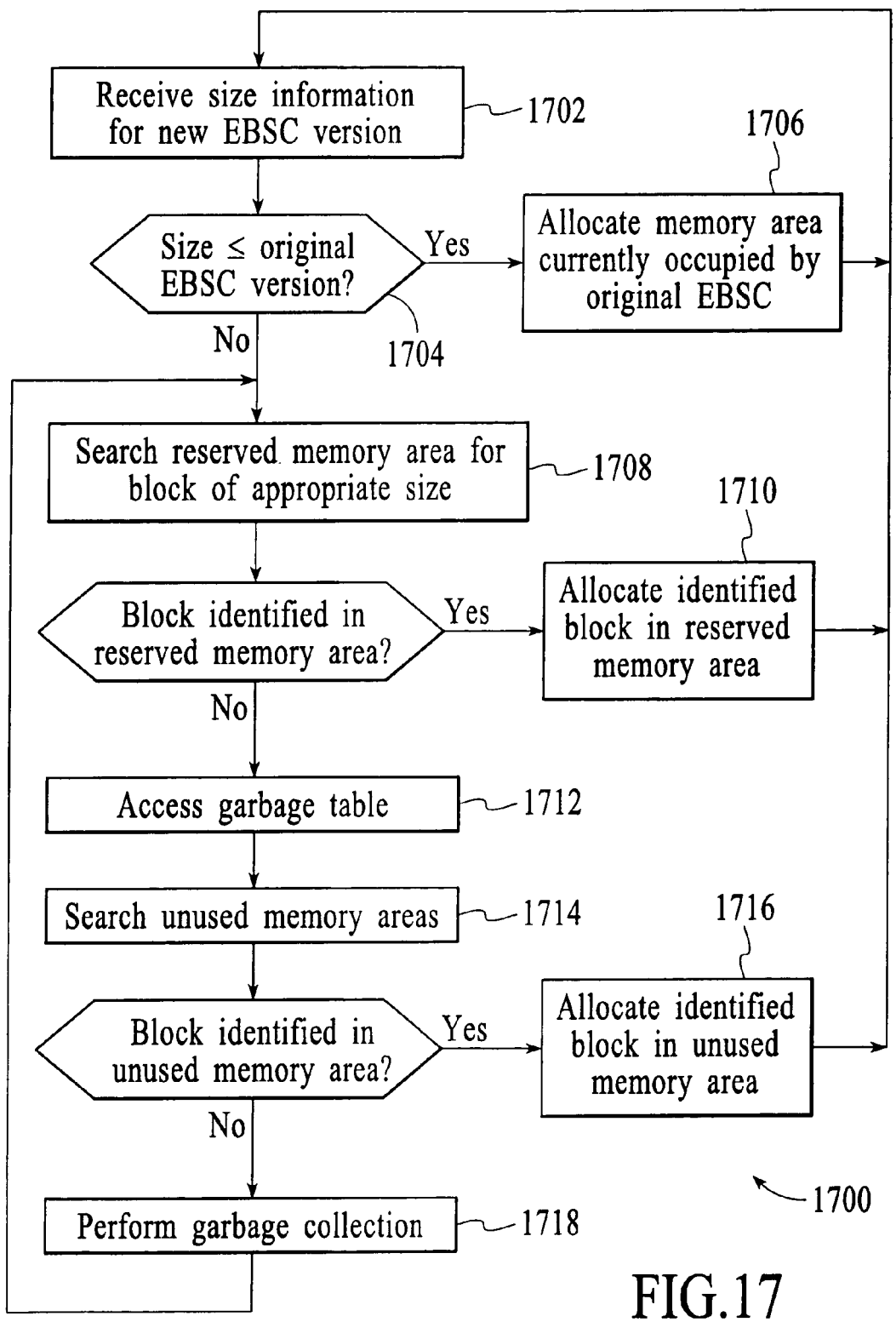
FIG. 17 is a flow diagram for locating memory areas to accommodate new versions of an EBSC using the rules of the reservation API, under an embodiment.

In allocating a memory block of the requested size, the reservation API 1504 applies a set of rules as follows, but alternative embodiments may apply different rules to effect equivalent results. FIG. 17 is a flow diagram 1700 for locating memory blocks to accommodate new versions of an EBSC using the rules of the reservation API 1504, under an embodiment. Upon receiving information as to the size of the new EBSC, at block 1702, the reservation API 1504 determines whether the size of the new EBSC exceeds that of the original EBSC, at block 1704. When the size of the new EBSC is equal to or less than the size of the corresponding original EBSC, the reservation API 1504 allocates the memory block currently occupied by the corresponding original EBSC to receive the new EBSC, at block 1706. Otherwise, the reservation API 1504 tries to locate a memory block having the requested size from the available memory in the reserved memory area.

In continuing the search, the reservation API 1504 searches the reserved memory area of the client device for a memory block having the requested size, at block 1708. If an appropriately sized block is found in the reserved memory area, the reservation API 1504 allocates the memory block to receive the new EBSC, at block 1710. If an appropriately sized memory block is not available in the reserved memory area, the reservation API 1504 accesses the garbage table 314, at block 1712. The reservation API 1504 uses information of the garbage table 314 to search the unused memory areas of the main program, at block 1714, in an attempt to locate a memory block of the requested size among the unused areas corresponding to the entries in the garbage table 314. The unused areas of an embodiment, referred to herein as garbage areas, include unused areas of the main program, but the embodiment is not so limited. If an appropriately sized memory block is found in the unused memory areas, the reservation API 1504 allocates the block to receive the new EBSC, at block 1716.

The reservation API 1504 of an embodiment initiates a process referred to herein as garbage collection, at block 1718, if it cannot locate an appropriately sized memory block. Also, the reservation API 1504 initiates garbage collection when all entries of the garbage table 214 are occupied. In an embodiment the API for garbage collection 1506, referred to herein as the garbage collection API 1506, is called by the reservation API 1504, but is not so limited. The API for garbage collection generally receives no argument and cleans up all garbage in the reserved areas for EBSCs and for EBSC update, but is not so limited.

Figure 18:
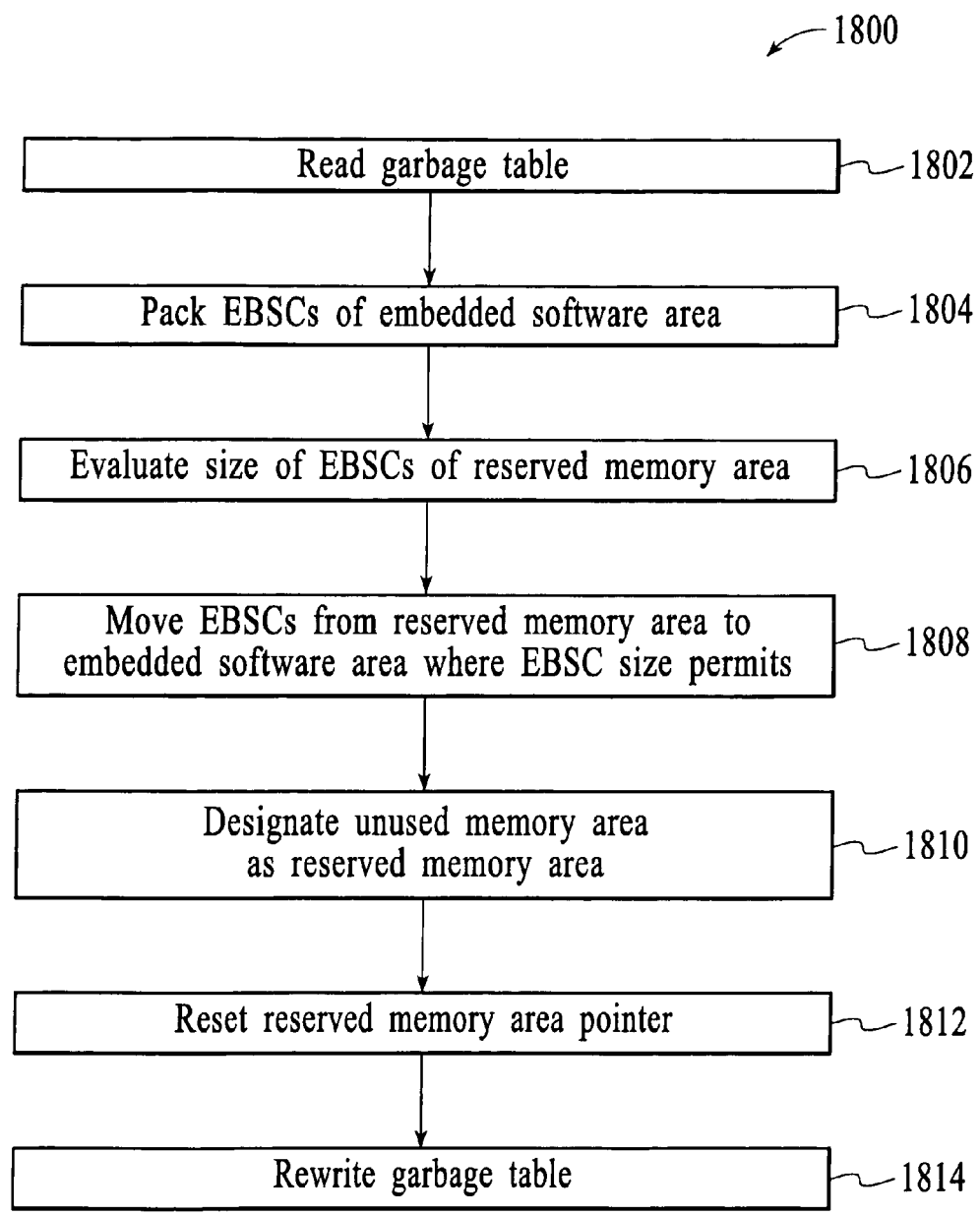
FIG. 18 is a flow diagram for collection of unused areas of the embedded software area (garbage collection), under an embodiment.

As described above, the reservation API 1504 initiates garbage collection if it cannot find enough memory for the requested reservation size or if the garbage entry table becomes full. FIG. 18 is a flow diagram 1800 of garbage collection, under an embodiment. In initiating garbage collection, the reservation API 1504 calls the garbage collection API 1506. When called, the garbage collection API 1506 reads the garbage table entries, at block 1802, and causes the embedded software area of the device memory to be rewritten so as to sequentially pack the EBSCs of the memory up in memory, at block 1804. Alternative embodiments may pack the EBSCs down in the main memory, but the embodiment is not so limited. This packing operation removes the unused areas in the embedded software area.

Following this packing operation, the garbage collection API 1506 evaluates the size of each EBSC stored in the reserved memory area, at block 1806, and compares the size against any unused memory blocks remaining in the main program of the embedded software area following its rewriting. This evaluation determines if the amount of unused memory remaining following the rewriting of the embedded software area can accommodate any EBSCs of the reserved memory area so that, where possible, EBSCs can be moved out of the reserved memory area and into the embedded software area of the device memory. The EBSCs of the reserved memory area are evaluated sequentially, but the embodiment is not so limited. The EBSCs are rewritten from the reserved memory area to the embedded software area where EBSC size permits, at block 1808. As the EBSCs are rewritten in one embodiment, they are stored sequentially in the embedded software area following the packed EBSCs.

The evaluation of the EBSCs stored in the reserved memory area continues until all EBSCs have been moved to the embedded software area, or until a determination is made that there is no remaining area in the embedded software area large enough to accommodate the EBSCs of the reserved memory area. Any EBSCs that can not be accommodated in the embedded software area remain in the reserved memory area, but the embodiment is not so limited.

Upon completion of the packing and moving operations, the garbage collection API 1506 reapportions the host device memory by redesignating any unused memory blocks of the host device main memory as reserved memory area, at block 1810. Further, the reserved memory area pointer is reset to maintain the start address of available memory in the reserved memory area, at block 1812. Additionally, at block 1814, the garbage table is rewritten to reflect the status of the unused memory area. The upgrade client 130 also updates the vector table 312 following the writing of a new version of an EBSC to any memory area other than the memory area occupied by the original version of the same EBSC.

Figure 19:
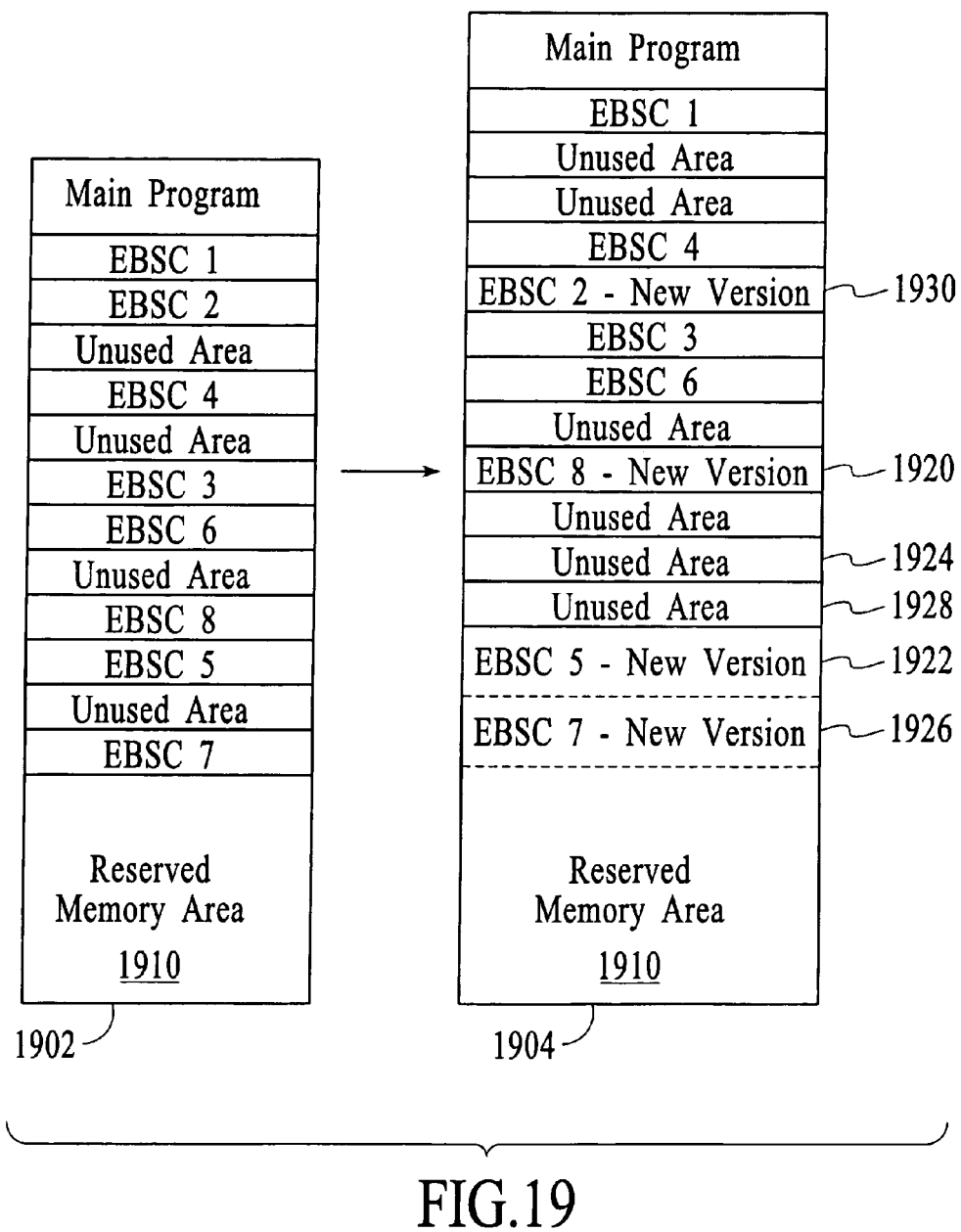
FIG. 19 is a block diagram of an example host device memory before and after upgrading operations of the reservation API, under an embodiment.
Figure 20:
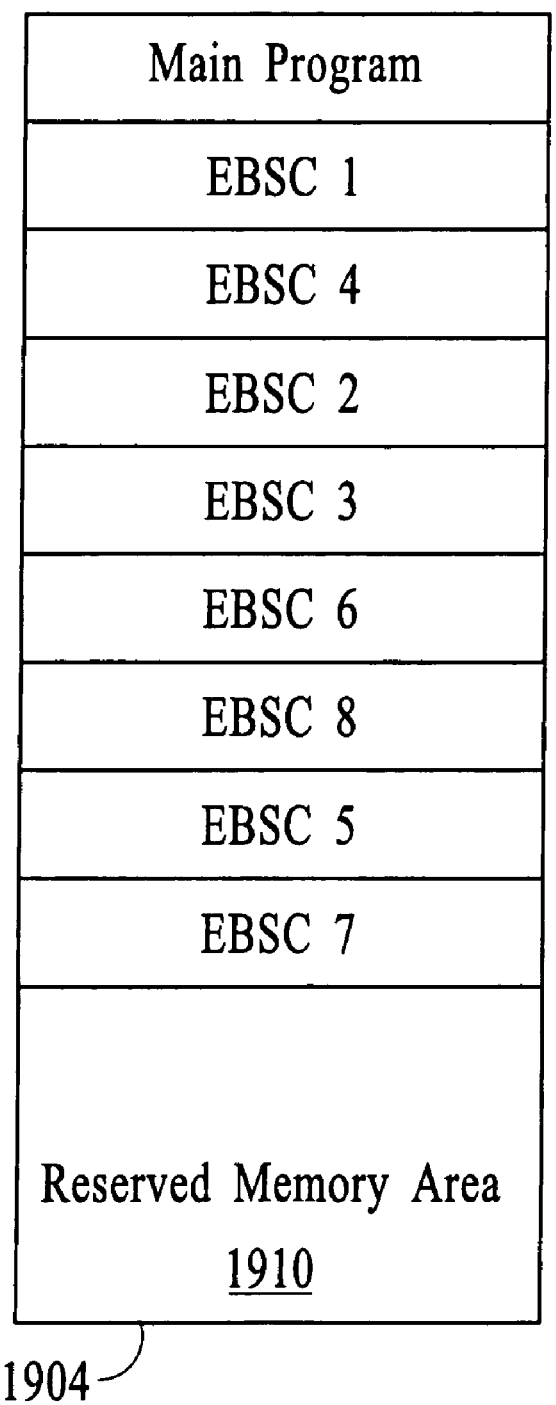
FIG. 20 is a block diagram of the host device memory following upgrading and garbage collection operations, under an embodiment.

An example of upgrading and garbage collection operations follows, with reference to FIGS. 15, 17, 19, and 20. FIG. 19 is a block diagram of an example host device memory before 1902 and after 1904 upgrading operations of the reservation API, under an embodiment. FIG. 20 is a block diagram of the host device memory 2004 following upgrading and garbage collection operations, under an embodiment.

This example begins with receipt of information on a new version of EBSC 8 by the reservation API. Upon receipt of the file size of the new version of EBSC 8, a determination is made as to whether the size of this new version is equal to or less than the size of the original EBSC. In this example, the original version of EBSC 8 contains 400 bytes while the new version of EBSC 8 contains 380 bytes. Therefore, the reservation API allocates the area 1920 currently occupied by the original version of EBSC 8 to receive the new version of EBSC 8.

The example continues with receipt of information for a new version of EBSC 5 by the reservation API. Upon receipt of the file size of the new version of EBSC 5, a determination is made as to whether the size of this new version is equal to or less than the size of the original EBSC. In this example, the original version of EBSC 5 contains 300 bytes while the new version of EBSC 5 contains 360 bytes. As the size of the new version is larger than that of the original version, the reservation API attempts to locate a memory block having the requested size from the available memory in the reserved memory area 1910. In this example, memory is available in the reserved memory area 1910, so the reservation API allocates an area 1922 in the reserved memory 1910 to receive the new version of EBSC 5. Furthermore, the reservation API allocates the area currently occupied by the original version of EBSC 5 as unused area 1924.

Next, the reservation API receives information on a new version of EBSC 7. The original version of EBSC 7 contains 550 bytes while the new version of EBSC 7 contains 560 bytes. As the size of the new version is larger than that of the original version, the reservation API attempts to locate a memory block having the requested size from the available memory in the reserved memory area 1910. In this example, memory is available in the reserved memory area 1910, so the reservation API allocates the next available area 1926 in the reserved memory 1910 to receive the new version of EBSC 7. Furthermore, the reservation API allocates the area currently occupied by the original version of EBSC 7 as unused area 1928.

As the example continues, the reservation API receives information on a new version of EBSC 2. While the original version of EBSC 2 includes 330 bytes, the new version of EBSC 2 contains 360 bytes. The reservation API determines that an appropriately sized area is not available in the reserved memory area 1910 and accesses the garbage table 314. The garbage table 314 is used in an attempt to locate a memory block of the requested size among the garbage areas identified using the entries in the garbage table 314. In this example, an unused area 1930 of an appropriate size is identified, and the reservation API allocates the unused area 1930 to receive the new version of EBSC 2.

As described above, the reservation API initiates garbage collection if it cannot find enough memory for the requested reservation size or if the garbage entry table becomes full. For this example, it is assumed that the next new EBSC version received following allocation in the reserved memory area for the new version of EBSC 2 results in initiation of garbage collection. The garbage collection of an embodiment packs the EBSCs up in the host device memory, resulting in a new host device memory configuration 1904 in which the EBSC order is EBSC 1, EBSC 4, EBSC 2, EBSC 3, EBSC 6, EBSC 8, EBSC 5, and EBSC 7. The garbage collection routine of an alternative embodiment packs the EBSCs down in the host device memory.

Figure 21:
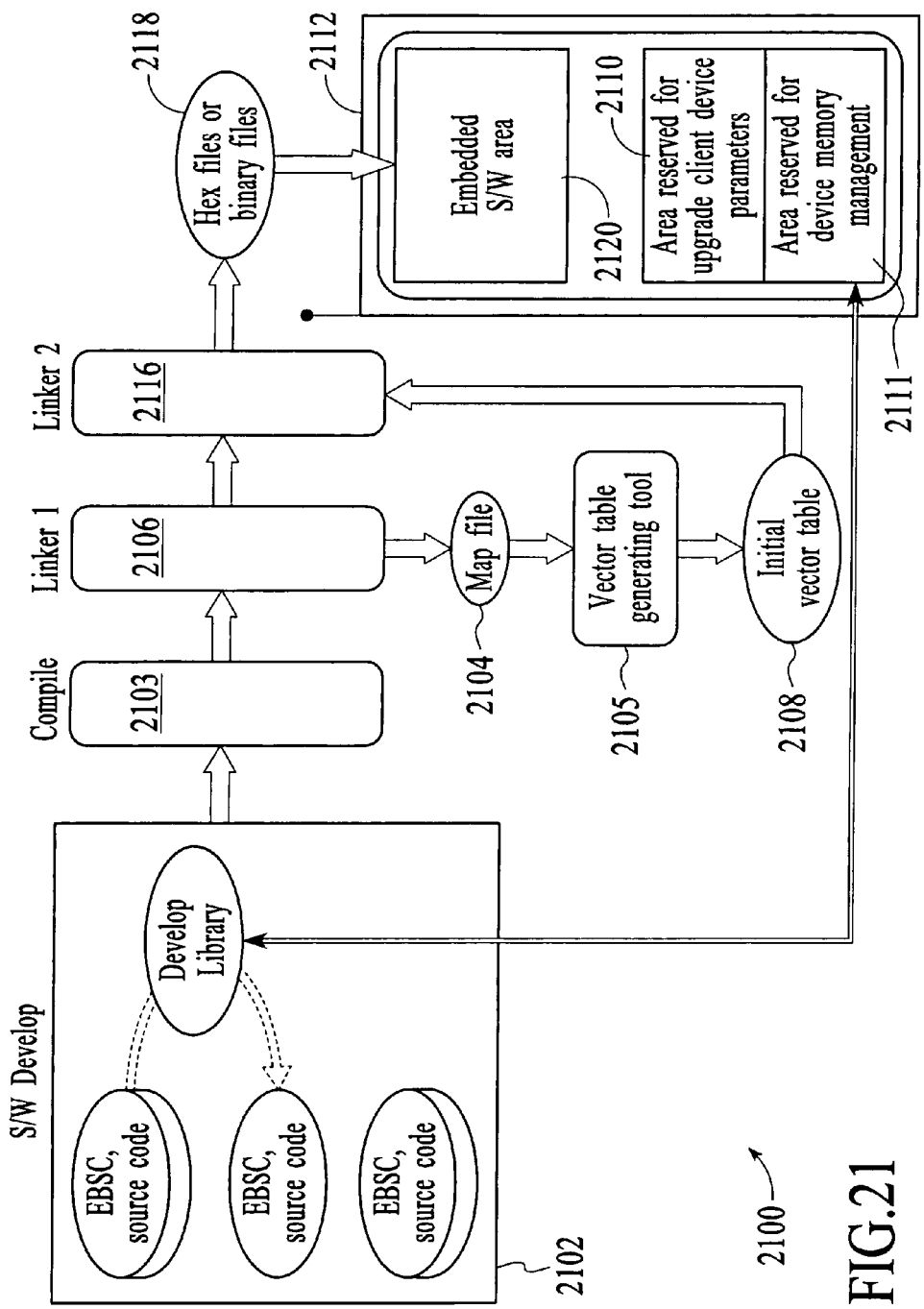
FIG. 21 is a block diagram of an embedded software development and deployment process using dynamic addressing, under an embodiment.

FIG. 21 is a block diagram 2100 of an embedded software development and deployment process using dynamic addressing, under an embodiment. This diagram depicts the process from EBSC development by the software component distributor 2102 to device ROM initialization using an upgrade client of an embodiment with dynamic addressing-based device memory management.

Components of the software component distributor 2102 receive source code of the new EBSCs, and compile 2103 the new EBSC source code. The compiling 2103 couples the resulting EBSC object code to the linkers 2106 and 2116 which, as part of the registration of the new EBSC, generate a new hex file (text) or binary file 2118 from the new EBSC object code. The new hex file corresponds to the new EBSC.

In supporting dynamic addressing, the software component distributor 2102 uses the compiler 2103 and linker 2106 to generate a map file 2104. This map file 2104 is used by a vector generating tool 2105 to generate a corresponding initial vector table 2108 of EBSCs. The vector table 2108 is subsequently provided to the linker 2116, and the linker 2116 generates the hex (text) or binary file 2118 using the initial vector table 2108. The hex (text) or binary file 2118 is downloaded into the embedded software area 2120 of the client device 2112, but alternative embodiments may write the hex file 2118 to other memory areas of the client device 2112. Components of the DMM library of the upgrade client maintain the vector table 2108 and, as such, support dynamic addressing of EBSCs. The DMM library overlaps with the vector table 2108 stored in the area reserved for upgrade client device parameters 2110.

Aspects of the invention may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," and words of similar import, when used in this application, shall refer to this application as a whole and not to any particular portions of this application.

The above description of illustrated embodiments of the invention is not intended to be exhaustive or to limit the invention to the precise form disclosed. While specific embodiments of, and examples for, the invention are described herein for illustrative purposes, various equivalent modifications are possible within the scope of the invention, as those skilled in the relevant art will recognize. The teachings of the invention provided herein can be applied to other processing and communication systems, not only for the cellular telephone system described above.

The elements and acts of the various embodiments described above can be combined to provide further embodiments. These and other changes can be made to the invention in light of the above detailed description.

All of the above references and United States patents and patent applications are incorporated herein by reference. Aspects of the invention can be modified, if necessary, to employ the systems, functions and concepts of the various patents and applications described above to provide yet further embodiments of the invention.

In general, in the following claims, the terms used should not be construed to limit the invention to the specific embodiments disclosed in the specification and the claims, but should be construed to include all processing systems that operate under the claims to provide a method for file differencing. Accordingly, the invention is not limited by the disclosure, but instead the scope of the invention is to be determined entirely by the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

What I claim is:

1. A method for managing memory of electronic devices, comprising:

updating electronic files of the devices by, receiving at least one new component of a new electronic file, the new electronic file being an updated version of an original electronic file;

identifying and reserving a memory block large enough to accommodate the new component by performing a sequential search of a first and second memory area, wherein the first memory area is rewritten to eliminate unused memory blocks and the first and second memory areas are reapportioned when a size of the new component exceeds a size of available memory blocks of the first and second memory areas;

writing the new component to the reserved memory block; and updating a vector table when the new component is written to a memory block other than an original memory block including the corresponding component of the original electronic file; and accessing the electronic files of the devices by, receiving a function call from a main program of the device, the function call including identification information of corresponding electronic files;

reading a start address of the corresponding electronic files from the vector table; and generating a call for the corresponding electronic files using the start address and the identification information.

2. The method of claim 1, wherein the identification information includes function identification and arguments to the function.

* * * * *